United States Patent
Cha et al.

(10) Patent No.: US 12,155,602 B2
(45) Date of Patent: Nov. 26, 2024

(54) METHOD FOR TRANSMITTING OR RECEIVING SIGNAL IN WIRELESS COMMUNICATION SYSTEM, AND DEVICE FOR SUPPORTING SAME

(71) Applicant: LG Electronics Inc., Seoul (KR)

(72) Inventors: Hyunsu Cha, Seoul (KR); Woosuk Ko, Seoul (KR); Hyunsoo Ko, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 17/608,454

(22) PCT Filed: May 4, 2020

(86) PCT No.: PCT/KR2020/005905
§ 371 (c)(1),
(2) Date: Nov. 2, 2021

(87) PCT Pub. No.: WO2020/222619
PCT Pub. Date: Nov. 5, 2020

(65) Prior Publication Data
US 2022/0224498 A1    Jul. 14, 2022

Related U.S. Application Data

(60) Provisional application No. 62/888,345, filed on Aug. 16, 2019.

(30) Foreign Application Priority Data

May 2, 2019    (KR) .................. 10-2019-0051733

(51) Int. Cl.
*H04L 5/00*    (2006.01)
*H04W 24/08*    (2009.01)
(Continued)

(52) U.S. Cl.
CPC .......... *H04L 5/0092* (2013.01); *H04L 5/0051* (2013.01); *H04W 24/08* (2013.01);
(Continued)

(58) Field of Classification Search
CPC ... H04L 5/0092; H04L 5/0051; H04L 5/0007; H04W 24/08; H04W 72/0453; H04W 76/28
See application file for complete search history.

(56) References Cited

U.S. PATENT DOCUMENTS

2019/0097874 A1*    3/2019    Zhou .................... H04L 5/0023

FOREIGN PATENT DOCUMENTS

WO    WO2019004909    1/2019

OTHER PUBLICATIONS

3rd Generation Partnership Project, "Technical Specification Group Radio Access Network; NR; Physical Layer Procedures for Data (Release 15)," 3GPP TS 38.214, V15.5.0, dated Mar. 2019, 105 pages.

(Continued)

*Primary Examiner* — Jamal Javaid
(74) *Attorney, Agent, or Firm* — Fish & Richardson P.C.

(57) ABSTRACT

A method comprises: receiving uplink reference signal (UL-RS) configuration information; transmitting UL-RS on a UL-RS resource configured based on the UL-RS configuration information; and decoding a physical downlink shared channel (PDSCH) in a predetermined resource region, wherein: based on the configuration of discontinuous reception (DRX), a physical downlink control channel for the PDSCH is monitored within ON duration related to the DRX; the UL-RS resource includes at least one resource element (RE); the at least one RE is configured as N-comb on a frequency domain; the start position of each of the at least one RE on the frequency domain is determined based (Continued)

on a predetermined offset and a comb offset included in the UL-RS configuration information; the predetermined offset is acquired based on at least one orthogonal frequency division multiplexing symbol of the at least one RE and the N-comb; and the N is a natural number.

10 Claims, 37 Drawing Sheets

(51) Int. Cl.
*H04W 72/0453* (2023.01)
*H04W 76/28* (2018.01)
(52) U.S. Cl.
CPC ....... *H04W 72/0453* (2013.01); *H04W 76/28* (2018.02); *H04L 5/0007* (2013.01)

(56) References Cited

OTHER PUBLICATIONS

Nokia, Nokia Shanghai Bell, "Views on DL and UL Reference Signals for NR Positioning," R1-1905262, 3GPP TSG RAN WG1 #96bis, Xi'an, China, Apr. 8-12, 2019, 10 pages.
PCT International Search Report and Written Opinion in International Appln No. PCT/KR2020/005905, dated Aug. 25, 2020, 18 pages.
Vivo, "Discussion on DL and UL RS for NR Positioning," R1-1904107, 3GPP TSG RAN WG1 #96bis, Xi'an, China, Apr. 8-12, 2019, 16 pages.

\* cited by examiner (a)

(b)

(a)

(b)

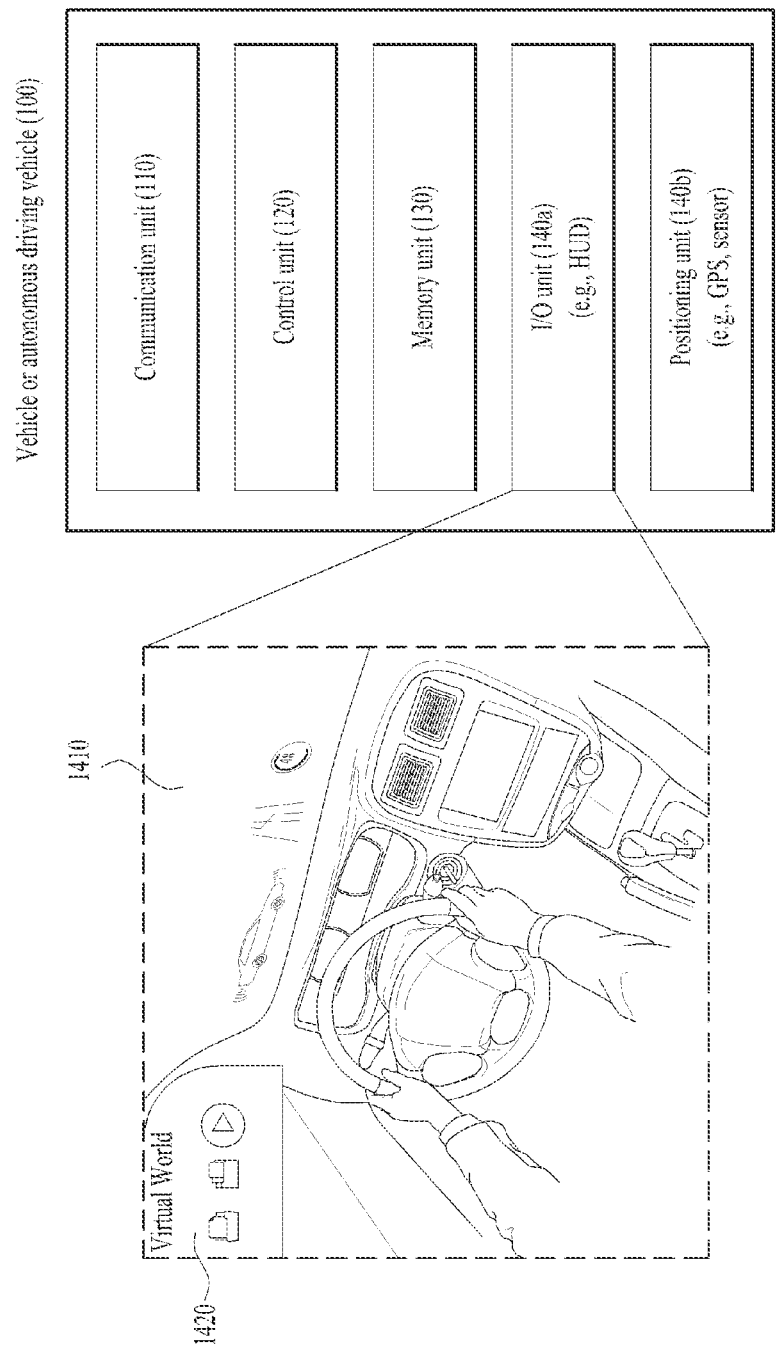

METHOD FOR TRANSMITTING OR RECEIVING SIGNAL IN WIRELESS COMMUNICATION SYSTEM, AND DEVICE FOR SUPPORTING SAME

CROSS-REFERENCE TO RELATED APPLICATIONS

This application is a National Stage application under 35 U.S.C. § 371 of International Application No. PCT/KR2020/005905, filed on May 4, 2020, which claims the benefit of Korean Patent Application No. 10-2019-0051733, filed on May 2, 2019, and U.S. Provisional Application No. 62/888,345, filed on Aug. 16, 2019. The disclosures of the prior applications are incorporated by reference in their entirety.

TECHNICAL FIELD

Various embodiments of the present disclosure relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

Various examples of the present disclosure may provide a method for transmitting and receiving a signal in a wireless communication system and an apparatus supporting the same.

For example, various examples of the present disclosure may provide a positioning method in a wireless communication system and an apparatus supporting the same.

For example, various examples of the present disclosure relate to UL RS resource configuration composed of N-combs, and may provide a positioning method capable of reducing signaling overhead because a starting position in the frequency domain of at least one RE included in the UL RS resource is obtained based on an offset included in UL RS configuration information and a predefined offset, and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various examples of the present disclosure may provide a method for transmitting and receiving a signal in a wireless communication system and an apparatus supporting the same.

In one aspect of the present disclosure, provided herein is a method for a user equipment (UE) in a wireless communication system, the method including receiving uplink reference signal (UL RS) configuration information, transmitting a UL RS on a UL RS resource configured based on the UL RS configuration information, the UL RS resource including at least one resource element (RE), and decoding a physical downlink shared channel (PDSCH) in a certain resource region, wherein, based on discontinuous reception (DRX) being configured, a physical downlink control channel (PDCCH) for the PDSCH is monitored within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

In another aspect of the present disclosure, provided herein is an apparatus in a wireless communication system, including at least one processor, and at least one memory operably coupled to the at least one processors to store one or more instructions configured to cause the at least one processor to perform operations, the operations including receiving uplink reference signal (UL RS) configuration information, transmitting a UL RS on a UL RS resource configured based on the UL RS configuration information, the UL RS resource including at least one resource element (RE), and decoding a physical downlink shared channel (PDSCH) in a certain resource region, wherein, based on discontinuous reception (DRX) being configured, a physical downlink control channel (PDCCH) for the PDSCH is monitored within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

In another aspect of the present disclosure, provided herein is a user equipment (UE) in a wireless communication system, including at least one transceiver, at least one processor, and at least one memory operably coupled to the at least one processors to store one or more instructions configured to cause the at least one processor to perform operations, the operations including receiving uplink reference signal (UL RS) configuration information, transmitting a UL RS on a UL RS resource configured based on the UL RS configuration information, the UL RS resource including at least one resource element (RE), and decoding a physical downlink shared channel (PDSCH) in a certain resource region, wherein, based on discontinuous reception (DRX) being configured, a physical downlink control channel (PDCCH) for the PDSCH is monitored within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

In another aspect of the present disclosure, provided herein is a computer-readable storage medium storing at least one computer program including one or more instructions that, when executed by at least one processor, cause the at least one processor to perform operations for a user equipment (UE), the operations including receiving uplink reference signal (UL RS) configuration information, transmitting a UL RS on a UL RS resource configured based on the UL RS configuration information, the UL RS resource including at least one resource element (RE), and decoding a physical downlink shared channel (PDSCH) in a certain resource region, wherein, based on discontinuous reception (DRX) being configured, a physical downlink control channel (PDCCH) for the PDSCH is monitored within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

In another aspect of the present disclosure, provided herein is a method for a base station in a wireless communication system, the method including transmitting uplink reference signal (UL RS) configuration information, receiving a UL RS on a UL RS resource configured based on the UL RS configuration information, the UL RS resource including at least one resource element (RE), and transmitting a physical downlink shared channel (PDSCH) in a predetermined resource region, wherein, based on discontinuous reception (DRX) being configured, a physical downlink control channel (PDCCH) for the PDSCH is transmitted within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

In another aspect of the present disclosure, provided herein is a base station in a wireless communication system, including at least one processor, and at least one memory operably coupled to the at least one processors to store one or more instructions configured to cause the at least one processor to perform operations, the operations including transmitting uplink reference signal (UL RS) configuration information, receiving a UL RS on a UL RS resource configured based on the UL RS configuration information, the UL RS resource including at least one resource element (RE), and transmitting a physical downlink shared channel (PDSCH) in a predetermined resource region, wherein, based on discontinuous reception (DRX) being configured, a physical downlink control channel (PDCCH) for the PDSCH is transmitted within an On duration related to the DRX, wherein the at least one RE is configured as an N-comb in a frequency domain, wherein a starting position of each of the at least one RE in the frequency domain is determined based on a comb offset included in the UL RS configuration information and a preset offset, wherein the preset offset is obtained based on the N-comb and at least one orthogonal frequency division multiplexing (OFDM) symbol for the at least one RE, wherein N is a natural number.

For example, based on the UL RS being configured for positioning, the preset offset may differ among the at least one OFDM symbol.

For example, each of the at least one RE may be configured at intervals of N from the starting position in ascending order in the frequency domain.

For example, the starting position of each of the at least one RE in the frequency domain may be determined based on a modulo N operation performed on a value obtained by adding the comb offset and the preset offset.

For example, the UL RS configuration information may be received through a higher layer.

For example, a transmit power for the UL RS may be determined based on a path-loss measured through a reference signal (RS) configured as quasi co-location (QCL) type-D.

For example, the UL RS may be a sounding reference signal (SRS).

Various embodiments of the present disclosure as described above are only some of preferred embodiments of the present disclosure, and those skilled in the art may derive and understand many embodiments in which technical features of the various embodiments of the present disclosure are reflected based on the following detailed description.

Advantageous Effects

According to various embodiments of the present disclosure, the following effects may be achieved.

According to various examples of the present disclosure, a method for transmitting and receiving a signal in a wireless communication system and an apparatus supporting the same may be provided.

For example, according to various examples of the present disclosure, a positioning method in a wireless communication system and an apparatus supporting the same may be provided.

For example, various examples of the present disclosure relate to UL RS resource configuration composed of N-combs, and may provide a positioning method capable of reducing signaling overhead because a starting position in the frequency domain of at least one RE included in the UL RS resource is obtained based on an offset included in UL RS configuration information and a predefined offset, and an apparatus supporting the same.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

FIG. 34 illustrates an exemplary vehicle to which various examples of the present disclosure are applied.

MODE FOR DISCLOSURE

Figure 1:
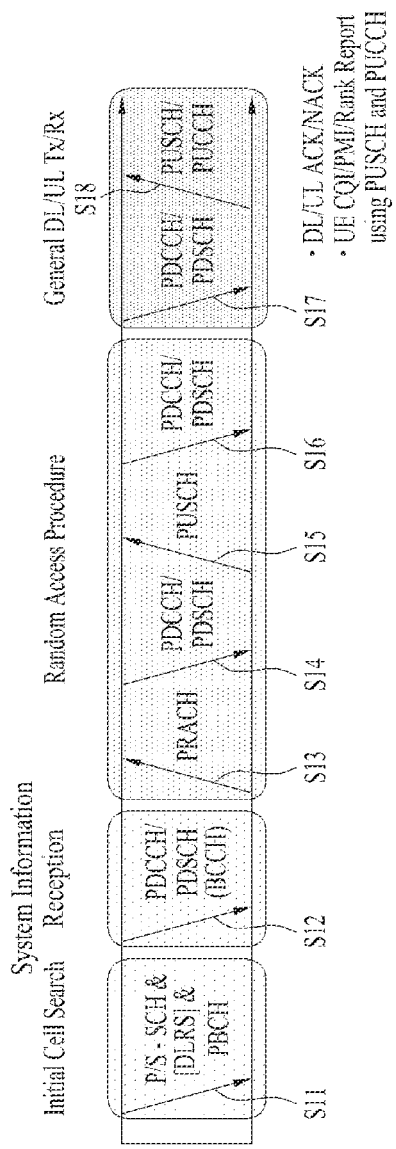
FIG. 1 is a diagram illustrating physical channels and a signal transmission method using the physical channels, which may be used in various examples of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the various embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a $3^{rd}$ generation partnership project (3GPP) system, a 3GPP long term evolution (LTE) system, a 3GPP $5^{th}$ generation (5G) new RAT (NR) system, or a 3GPP2 system. In particular, various embodiments of the present disclosure may be supported by standard specifications including 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and 3GPP TS 38.455. That is, steps or parts which are not described in various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be combined into one operation for a UE transmission, and steps S14 and S16 may be combined into one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
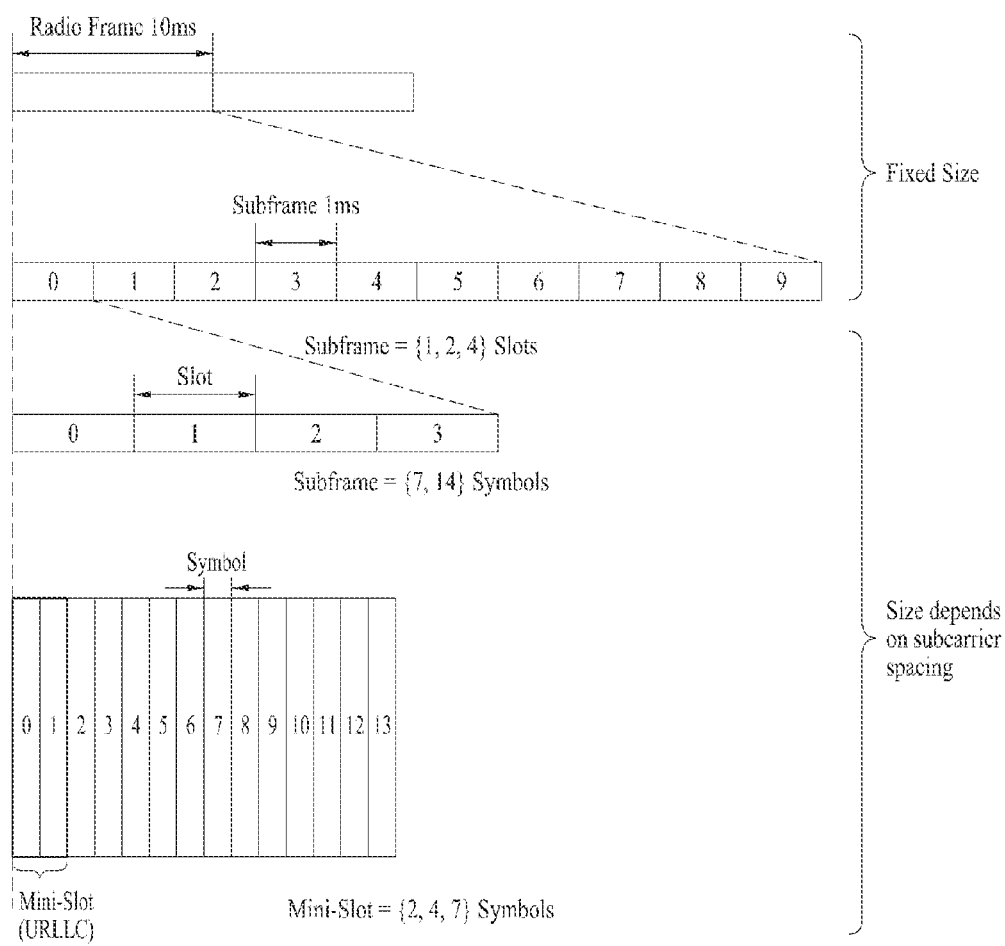
FIG. 2 is a diagram illustrating a radio frame structure in a new radio access technology (NR) system to which various examples of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or u). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, µ and a CP are obtained from RRC parameters provided by the BS.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mm Wave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz})*2048)$ are placed in the following relationship: $T_s/T_c = 64$. DL and UL transmissions are organized into (radio) frames each having a duration of $T_f = (\Delta f_{max} * N_f / 100) * T_c = 10$ ms. Each radio frame includes 10 subframes each having a duration of $T_{sf} = (\Delta f_{max} * N_f / 1000) * T_c = 1$ ms. There may exist one set of frames for UL and one set of frames for DL. For a numerology u, slots are numbered with $n^\mu_s = \{0, \ldots, N^{slot,\mu}_{subframe} - 1\}$ in an increasing order in a subframe, and with $n^\mu_{s,f} \in \{0, \ldots, N^{slot,\mu}_{frame} - 1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM (A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
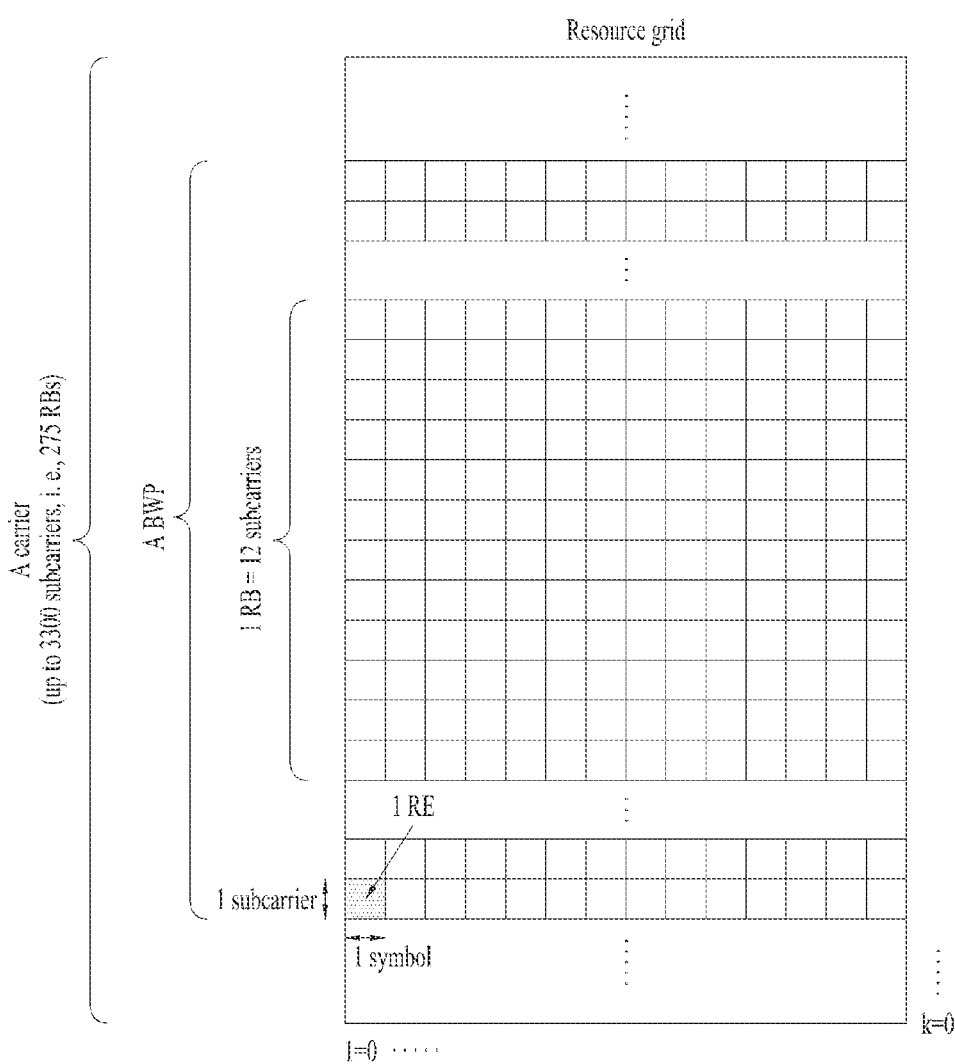
FIG. 3 is a diagram illustrating a slot structure in an NR system to which various examples of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P) RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
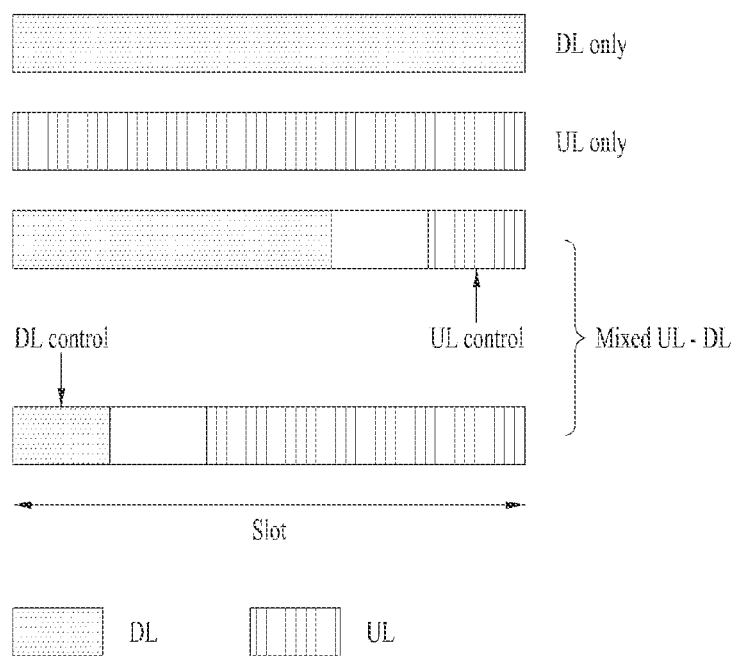
FIG. 4 is a diagram illustrating a self-contained slot structure to which various examples of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
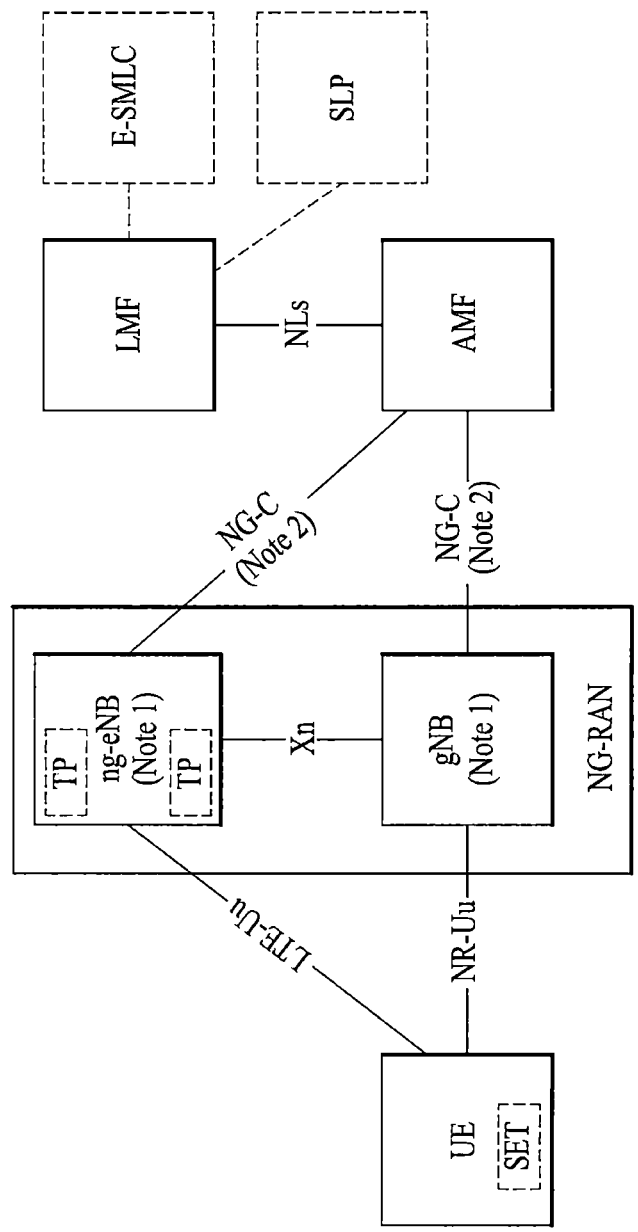
FIG. 12 is a diagram illustrating an example of an architecture of a system for positioning a UE, to which various examples of the present disclosure are applicable.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
| --- | --- | --- | --- |
| Type 0-PDCCH | Common | SI-RNTI on a primary cell | SIB Decoding |
| Type 0A-PDCCH | Common | SI-RNTI on a primary cell | SIB Decoding |
| Type 1-PDCCH | Common | RA-RNTI or TC-RNTI on a primary cell | Msg2, Msg4 decoding in RACH |
| Type 2-PDCCH | Common | P-RNTI on a primary cell | Paging Decoding |
| Type 3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifiying a group of UEs of the slot format |
| 2_1 | Notifiying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM)

waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | <2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell SEARCH

Figure 5:
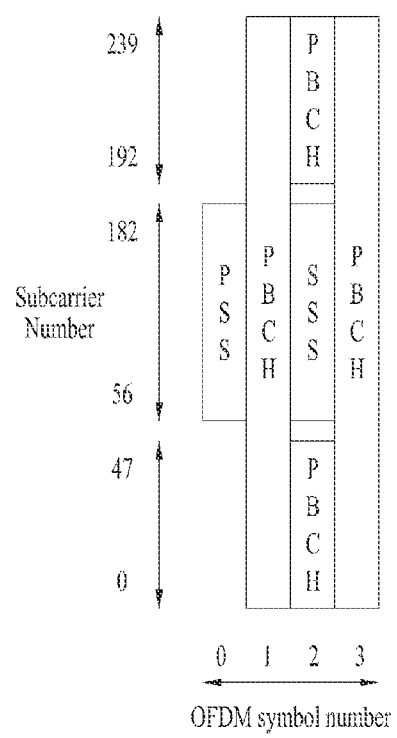
FIG. 5 is a diagram illustrating a synchronization signal block (SSB) structure to which various examples of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, and the like based on the SSB. Terms SSB the synchronization signal/physical broadcast channel (SS/PBCH) block will be interchangeably used.

Referring to FIG. 5, the SSB includes a PSS, an SSS, and a PBCH. The SSB includes four consecutive OFDM symbols, and the PSS, the PBCH, the SSS/PBCH, and the PBCH are transmitted in the respective OFDM symbols. Each of the PSS and the SSS includes one OFDM symbol by 127 subcarriers, and the PBCH includes three OFDM symbols by 576 subcarriers. Polar coding and QPSK are applied to the PBCH. The PBCH includes data REs and demodulation reference signal (DMRS) REs in every OFDM symbol. There are three DMRS REs per RB, with three data REs between every two adjacent DMRS REs.

Cell search is a process of acquiring time/frequency synchronization with a cell and detecting the identifier (ID) (e.g., physical cell ID (PCID)) of the cell. The PSS is used to detect a cell ID in a cell ID group, and the SSS is used to detect the cell ID group. The PBCH is used to detect an SSB (time) index and a half-frame.

The cell search process of the UE may be summarized in Table 8.

TABLE 8

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACE configuration |

There may be 336 cell ID groups, each including three cell IDs. There may be 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
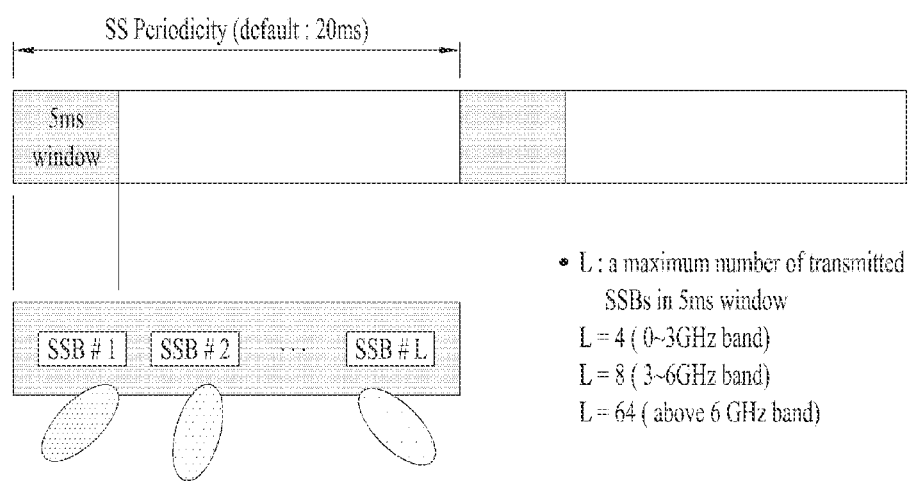
FIG. 6 is a diagram illustrating an exemplary SSB transmission method to which various examples of the present disclosure are applicable.

FIG. 6 is an exemplary SSB transmission method to which various embodiments of the present disclosure are applicable.

Referring to FIG. 6, an SSB is periodically transmitted according to an SSB periodicity. A basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured in a 5-ms time window (i.e., half-frame), and an SSB may be repeatedly transmitted up to L times within the SS burst set. The maximum number L of transmissions of the SSB may be given according to the frequency band of a carrier as follows. One slot includes up to two SSBs.

For frequency range up to 3 GHZ, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in temporal order within the SSB burst set (i.e., half-frame).

Case A: 15-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as $\{4, 8, 16, 20\}+28*n$ where n=0 for a carrier frequency equal to or lower than 3 GHZ, and n=0, 1 for a carrier frequency of 3 GHz to 6 GHz.

Case C: 30-kHz SCS: The indexes of the first symbols of candidate SSBs are given as $\{2, 8\}+14*n$ where n=0, 1 for a carrier frequency equal to or lower than 3 GHZ, and n=0, 1, 2, 3 for a carrier frequency of 3 GHz to 6 GHz.

Case D: 120-kHz SCS: The indexes of the first symbols of candidate SSBs are given as $\{4, 8, 16, 20\}+28*n$ where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as $\{8, 12, 16, 20, 32, 36, 40, 44\}+56*n$ where n=0, 1, 2, 3, 5, 6, 7, 8 for a carrier frequency above 6 GHz.

1.5. Beam Alignment

Figure 7:
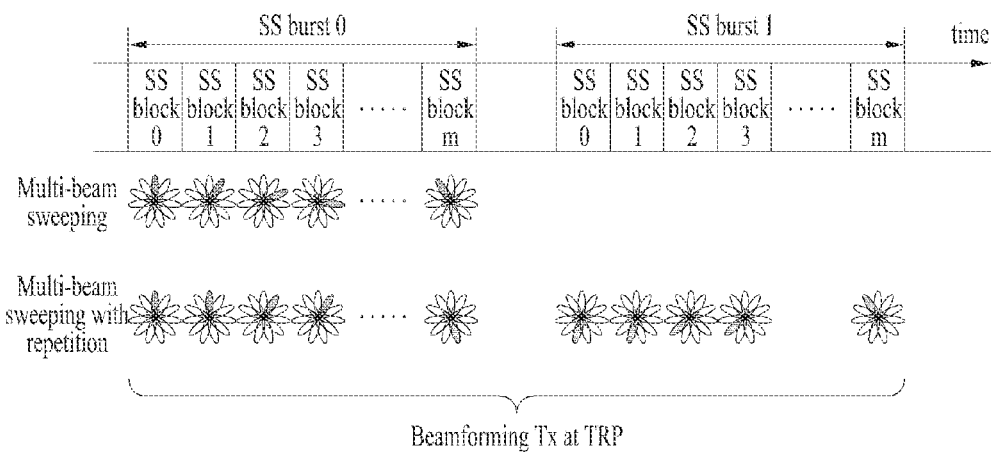
FIG. 7 is a diagram illustrating exemplary multi-beam transmission of SSBs, which is applicable to various examples of the present disclosure.

FIG. 7 illustrates exemplary multi-beam transmission of SSBs, which is applicable to various embodiments of the present disclosure.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SSB (index) group basis. In the latter case, the same SSB beam is maintained in an SSB (index) group. That is, the transmission (Tx) beam direction of an SSB is repeated over a plurality of successive SSBs. A maximum allowed transmission number L for an SSB in an SSB burst set is 4, 8 or 64 according to the frequency band of a carrier. Accordingly, a maximum number of SSB beams in the SSB burst set may also be given according to the frequency band of a carrier as follows.

For frequency range up to 3 GHZ, Max number of beams=4
For frequency range from 3 GHz to 6 GHZ, Max number of beams=8
For frequency range from 6 GHz to 52.6 GHZ, Max number of beams=64

Without multi-beam transmission, the number of SSB beams is 1.

When the UE attempts initial access to the BS, the UE may align beams with the BS based on an SSB. For example, the UE detects SSBs and then identifies the best SSB. Subsequently, the UE may transmit an RACH preamble in a PRACH resource linked/corresponding to the index (i.e., beam) of the best SSB. The SSB may also be used for beam alignment between the BS and the UE even after the initial access.

1.6. Channel Measurement and Rate-Matching

Figure 8:
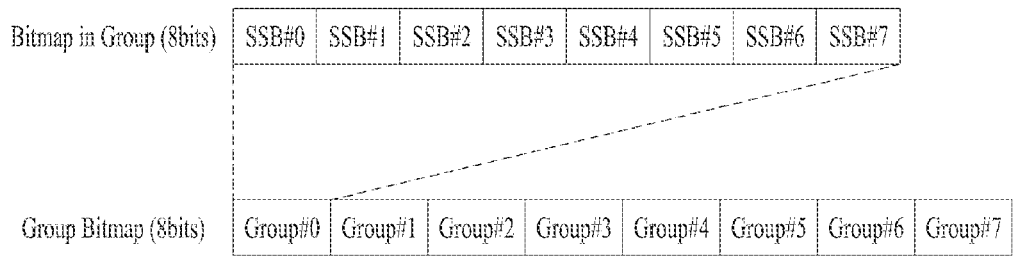
FIG. 8 is a diagram illustrating an exemplary method of indicating an actually transmitted SSB, SSB_tx, which is applicable to various examples of the present disclosure.

FIG. 8 is a diagram illustrating an exemplary method of indicating an actually transmitted SSB, SSB_tx, which is applicable to various embodiments of the present disclosure.

Up to L SSBs may be transmitted in an SSB burst set, and the number/positions of actually transmitted SSBs may be different for each BS/cell. The number/positions of actually transmitted SSBs are used for rate-matching and measurement, and information about the actually transmitted SSBs is indicated as follows.

Rate-matching-related: The information may be indicated by UE-specific RRC signaling or RMSI. The UE-specific RRC signaling includes full bitmaps (e.g., of length L) for FR1 and FR2. The RMSI includes a full bitmap for FR1 and a compressed bitmap for FR2 as illustrated. Specifically, the information about actually transmitted SSBs may be indicated by a group bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

Measurement-related: In RRC connected mode, the network (e.g., the BS) may indicate an SSB set to be measured within a measurement period. An SSB set may be indicated on a frequency layer basis. In the absence of an indication related to an SSB set, a default SSB set is used. The default SSB set includes all SSBs within a measurement period. The SSB set may be indicated by a full bitmap (e.g., of length L) of RRC signaling. In RRC idle mode, the default SSB set is used.

1.7. QCL (Quasi Co-Located or Quasi Co-Location)

The UE may receive a list of up to M TCI-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

1.8. UL-DL Timing Relationship

Figure 9:
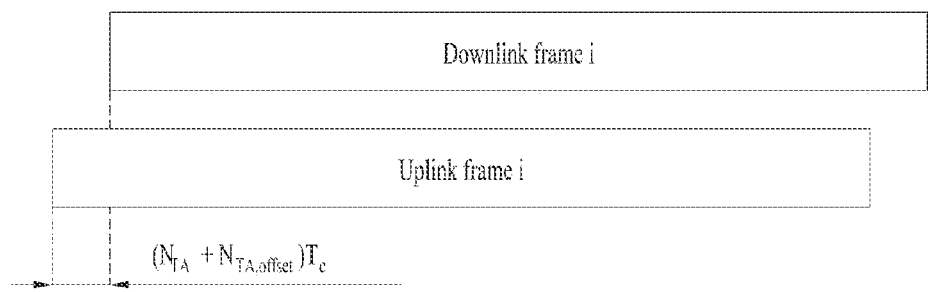
FIG. 9 is a diagram illustrating an exemplary UL-DL timing relationship, which is applicable to various examples of the present disclosure.

FIG. 9 is a diagram illustrating an exemplary UL-DL timing relationship applicable to various embodiments of the present disclosure.

Referring to FIG. 9, a UE starts to transmit UL frame i $T_{TA}=(N_{TA}+N_{TA,offset})T_c$ seconds before transmission of a DL radio frame corresponding to UL radio frame i. However, $T_{TA}=0$ is exceptionally used for msgA transmission on a PUSCH.

Each parameter may be defined as described in Table 10 below.

[Table 10]

—$N_{TA}$

In case of random access response, a timing advance command [11, TS 38.321], $T_A$, for a TAG indicates $N_{TA}$ values of $T_A=0, 1, 2, \ldots, 3846$, where an amount of the time alignment for the TAG with SCS of $2^\mu \cdot 15$ KHz is $N_{TA}=T_A \cdot 16 \cdot 64/2^\mu \cdot N_{TA}$ is defined in [4, TS 38.211] and is relative to the SCS of the first uplink transmission from the UE after the reception of the random access response.

In other cases, a timing advance command [11, TS 38.321], TA, for a TAG indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^\mu \cdot 15$ kHz, $N_{TA\_new}=N_{TA\_old}+(T_A-31) \cdot 16 \cdot 64/2^\mu$.

| Frequency range and band of cell used for uplink transmission | $N_{TA\_offset}$ (Unit: Tc) |
|---|---|
| FR1 FDD band without NTE-NR coexistence case or FR1 TDD band without NTE-NR coexistence case | 25600 (Note 1) |
| FR1 FDD band with NTE-NR coexistence case | 0 (Note 1) |
| FR1 TDD band with NTE-NR coexistence case | 39936 (Note 1) |
| FR2 | 13792 |

Note 1:
The UE identifies $N_{TA\_offset}$ based on the information n-TimingAdvanceOffset as specified in TS 38.331 [2]. If UE is not provided with the information n-TimingAdvanceOffset, the default value of $N_{TA\_offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of NTA offset can also be provided for a FDD serving cell.
Note 2:
Void —$N_{TA\_offset}$
—$T_c=0.509$ ns

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 10:
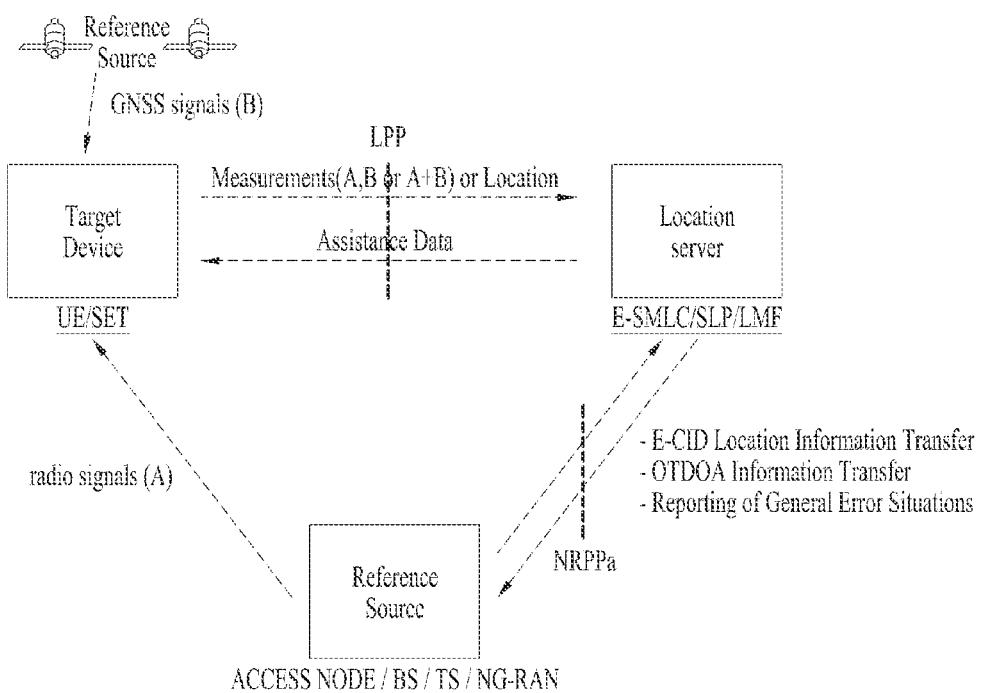
FIG. 10 is a diagram illustrating an exemplary positioning protocol configuration for UE positioning, which is applicable to various examples of the present disclosure.

FIG. 10 is a diagram illustrating an exemplary positioning protocol configuration for UE positioning, to which various embodiments of the present disclosure are applicable.

Referring to FIG. 10, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:
E-CID Location Information Transfer. This function allows exchange of location information between a reference source and an IMF, for the purpose of E-CID positioning.
OTDOA Information Transfer. This function allows exchange of information between the reference source and the LMF for the purpose of OTDOA positioning.
Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{SV}^{RB} \cdot N_{SC}^{RB}$ denotes the size of an RB in the frequency domain, for example, 12 subcarriers.

c (i) denotes a pseudo-random sequence and may be initialized by Equation 2 below.

$$c_{init}=2^{28} \cdot \lfloor N_{ID}^{PRS}/512 \rfloor + 2^{10} \cdot (7 \cdot (n_s 3+1)+l+1) \cdot (2 \cdot (N_{ID}^{PRS} \bmod 512)+1)+2 \cdot (N_{ID}^{PRS} \bmod 512)+N_{CP} \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

Figure 11:
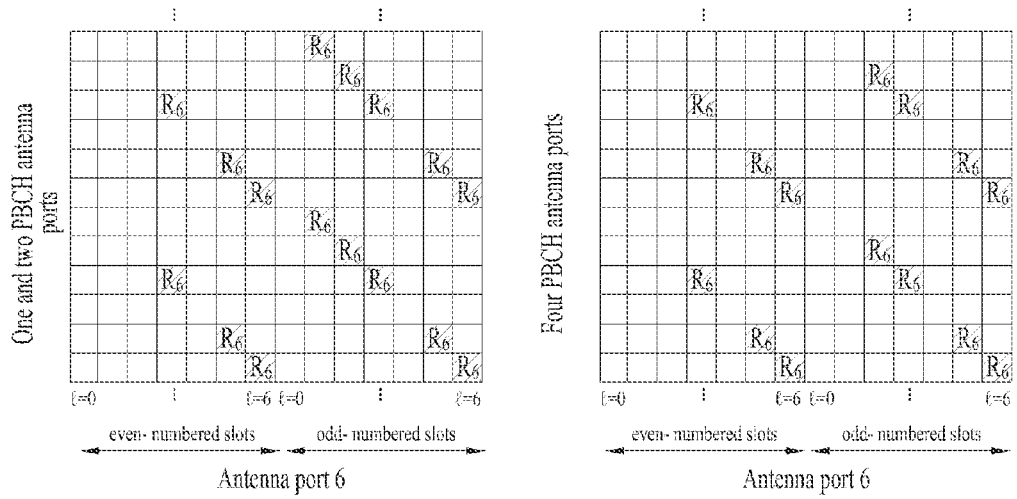
FIG. 11 illustrates exemplary mapping of a positioning reference signal (PRS) in a long term evolution (LTE) system to which various examples of the present disclosure are applicable.
Figure 11:
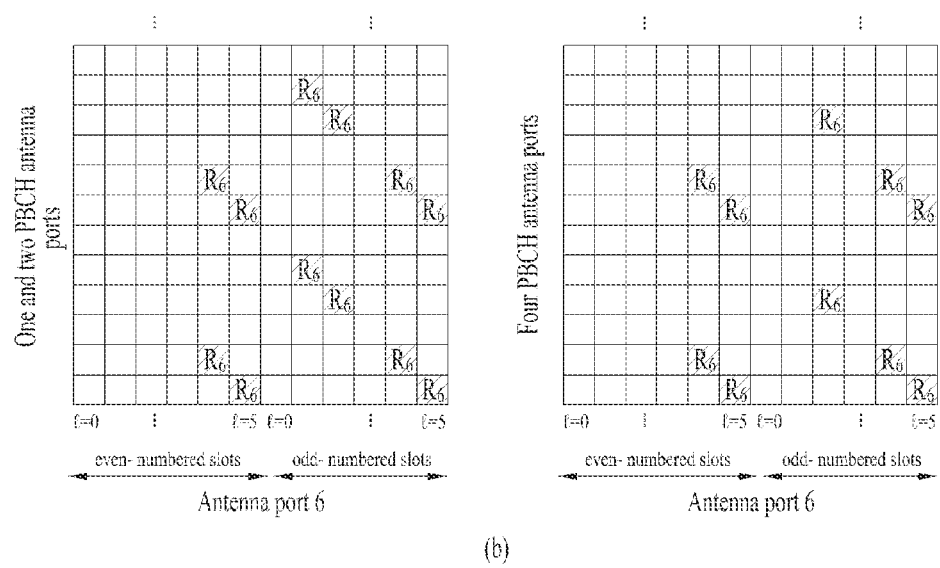

FIG. 11 illustrates an exemplary pattern to which a PRS is mapped in a subframe.

As illustrated in FIG. 11, the PRS may be transmitted through an antenna port 6. FIG. 11(*a*) illustrates mapping of the PRS in the normal CP and FIG. 11(*b*) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 11

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

FIG. 12 illustrates architecture of a 5G system applicable to positioning of a UE connected to an NG-RAN or an E-UTRAN.

Referring to FIG. 12, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 13:
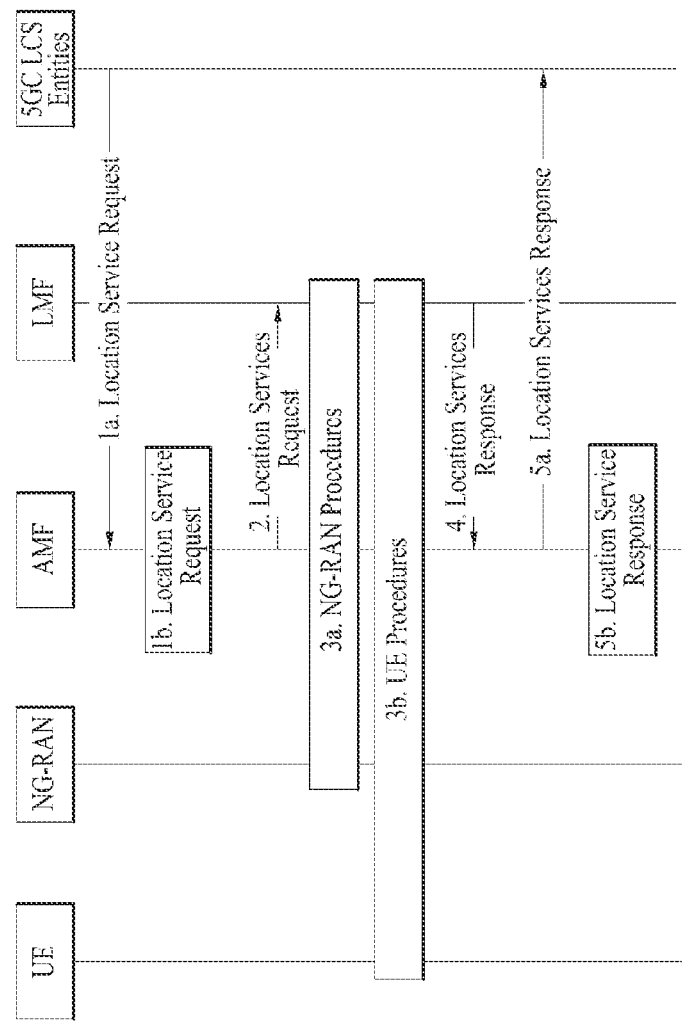
FIG. 13 is a diagram illustrating an example of a procedure of positioning a UE, to which various examples of the present disclosure are applicable.

FIG. 13 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol 2.5.1. LTE Positioning Protocol (LPP)

Figure 14:
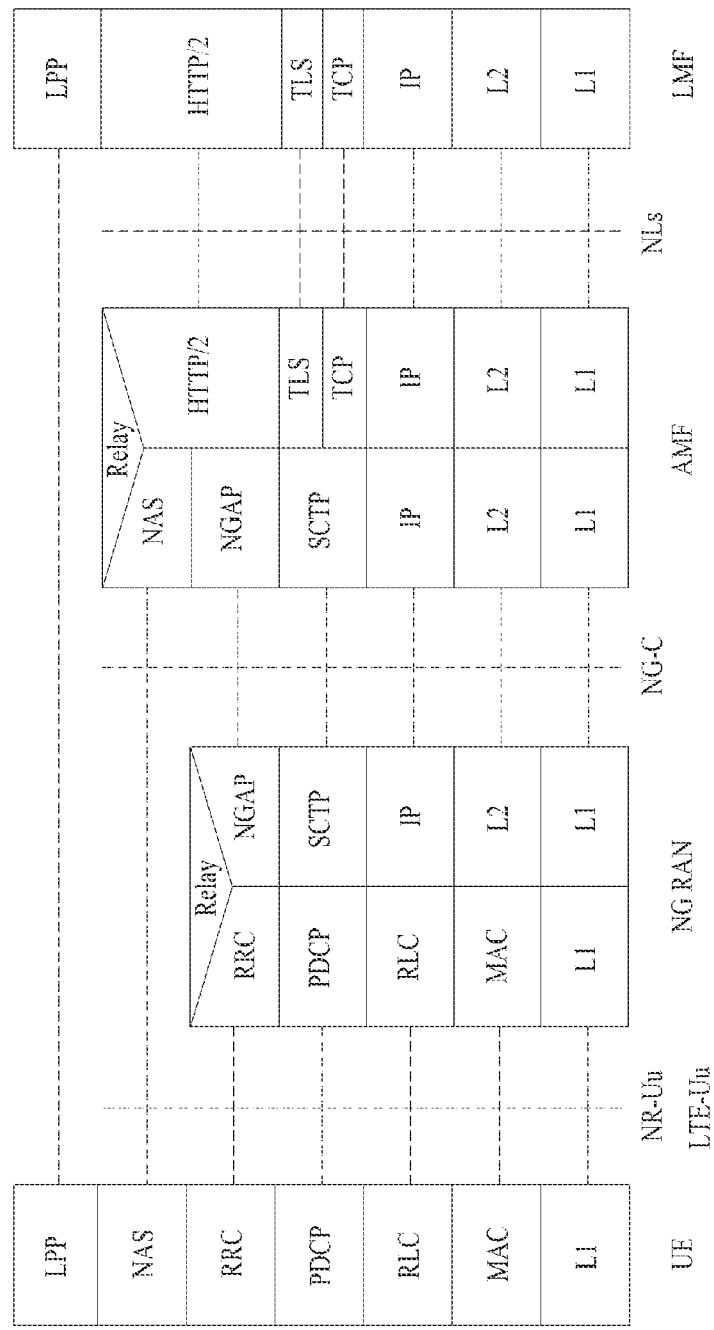
FIG. 14 is a diagram illustrating protocol layers for supporting LTE positioning protocol (LPP) message transmission, to which various examples are applicable.

FIG. 14 illustrates an exemplary protocol layer used to support LPP message transfer between an LMF and a UE. An LPP protocol data unit (PDU) may be carried in a NAS PDU between an AMF and the UE.

Referring to FIG. 22, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

Figure 15:
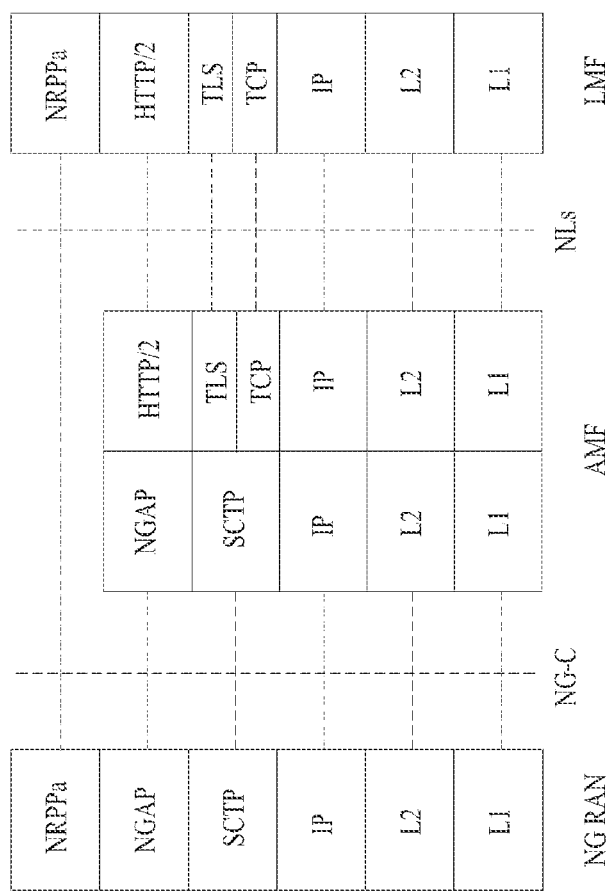
FIG. 15 is a diagram illustrating protocol layers for supporting NR positioning protocol A (NRPPa) protocol data unit (PDU) transmission, to which various examples are applicable.

FIG. 15 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 16:
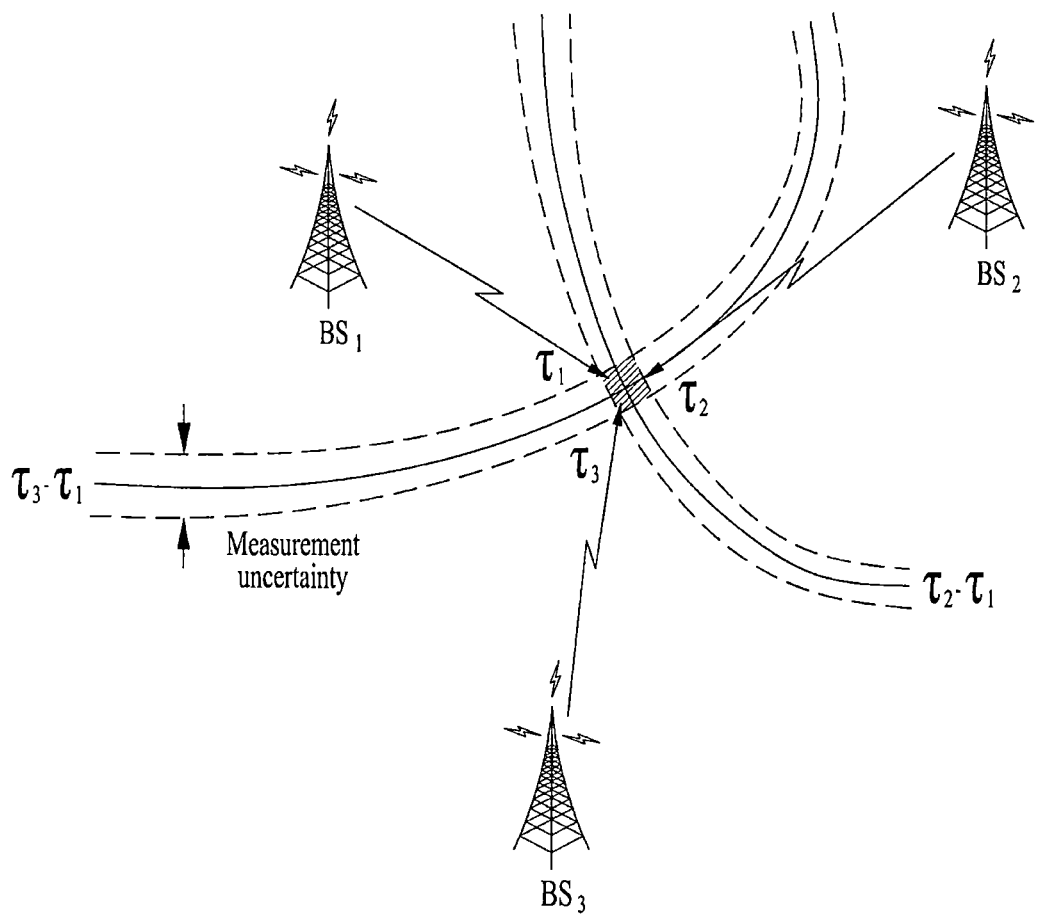
FIG. 16 is a diagram illustrating an observed time difference of arrival (OTDOA) positioning method, to which various examples are applicable.

FIG. 16 is a diagram illustrating an observed time difference of arrival (OTDOA) positioning method, to which various embodiments are applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 3]}$$

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows:
  UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io
  E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 17:
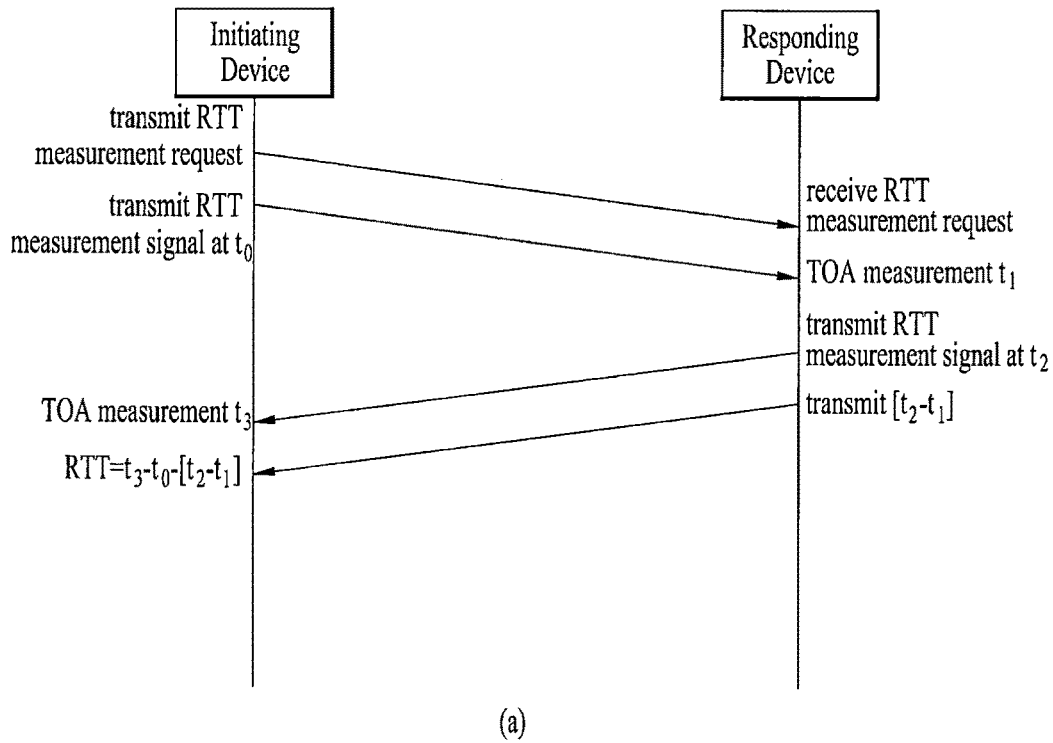
FIG. 17 is a diagram illustrating a multi-round trip time (multi-RTT) positioning method to which various examples are applicable.
Figure 17:
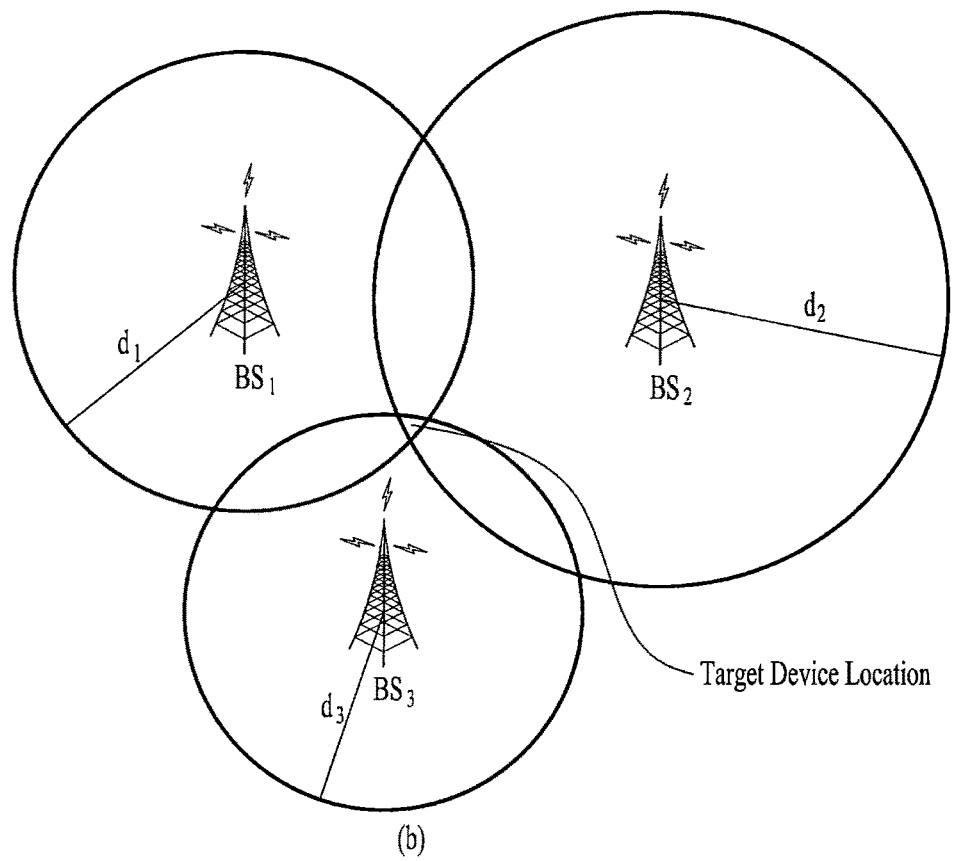

FIG. 17 is a diagram illustrating an exemplary multi-RTT positioning method to which various embodiments of the present disclosure are applicable.

Referring to FIG. 17(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time t0, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1]$$ [Equation 4]

Referring to FIG. 17(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments of the Present Disclosure

Various embodiments of the present disclosure will be described below in detail based on the above-described technical idea. Section 1 and Section 2 may be applied to the various embodiments of the present disclosure. For example, operations, functions, and terms which are not defined in the various embodiments of the present disclosure may be performed and described based on Section 1 and Section 2.

Symbol/abbreviations/terms used in the following description of various embodiments of the present disclosure are described below.

AOA (AoA): angle of arrival
CSI-RS: channel state information reference signal
ECID: enhanced cell identifier
GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal
RTT: round trip time
RSRP: reference signal reception power
RSTD: reference signal time difference/relative signal time difference
SRS: sounding reference signal
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UTDOA (UTDoA): uplink time difference of arrival

3.1. Configuring RE Pattern of SRS Used for Positioning

A Comb-N RE pattern of a DL PRS resource for UE positioning may be supported to map a DL PRS sequence to an RE. The Comb-N pattern may be shifted across symbols within the DL PRS resource.

According to the present disclosure, a UL RS (e.g., SRS) resource may be configured/indicated for UE positioning, like a DL PRS. Hereinafter, the SRS will be described as an example in the present disclosure, but the SRS of the present disclosure may be replaced with a UL RS used for positioning. First, SRS configuration information related to the SRS resource will be described. As SRS configuration information, SRS-Config IE may be used for SRS transmission configuration. The SRS configuration defines a list of SRS resources and a list of SRS resource sets. Each SRS resource set, which includes at least one SRS resource, defines a set of SRS resources. The network may trigger transmission of a set of SRS resources using the configured aperiodicSRS-ResourceTrigger. Table 11 below shows information that may be included in the SRS-Config 1E.

TABLE 11

```
SRS-Config ::=                    SEQUENCE {
    srs-ResourceSetToReleaseList    SEQUENCE (SIZE(1..maxNrofSRS-ResourceSets)) OF
SRS-ResourceSetId    OPTIONAL,    -- Need N
    srs-ResourceSetToAddModList     SEQUENCE (SIZE(1..maxNrofSRS-ResourceSets))
OF SRS-ResourceSet    OPTIONAL,    -- Need N
    srs-ResourceToReleaseList      SEQUENCE (SIZE(1..maxNrofSRS-Resources)) OF
SRS-ResourceId    OPTIONAL,    -- Need N
    srs-ResourceToAddModList       SEQUENCE (SIZE(1..maxNrofSRS-Resources)) OF
```

TABLE 11-continued

```
 SRS-Resource      OPTIONAL, -- Need N
   tpc-Accumulation         ENUMERATED {disabled}
OPTIONAL, -- Need S
   ...,
   [[
   srs-RequestForDCI-Format1-2-r16    INTEGER (1..2)
OPTIONAL, -- Need S
   srs-RequestForDCI-Format0-2-r16    INTEGER (1..2)
OPTIONAL, -- Need S
   srs-ResourceSetToAddModListForDCI-Format0-2-r16 SEQUENCE (SIZE(1..maxNrofSRS-
ResourceSets)) OF SRS-ResourceSet OPTIONAL, -- Need N
   srs-ResourceSetToReleaseListForDCI-Format0-2-r16 SEQUENCE (SIZE(1..maxNrofSRS-
ResourceSets)) OF SRS-ResourceSetId OPTIONAL,-- Need N
   srs-PosResourceSetToReleaseList-r16   SEQUENCE (SIZE(1..maxNrofSRS-
PosResourceSets-r16)) OF SRS-PosResourceSetId-r16
                                                   OPTIONAL, -- Need N
   srs-PosResourceSetToAddModList-r16   SEQUENCE (SIZE(1..maxNrofSRS-
PosResourceSets-r16)) OF SRS-PosResourceSet-r16 OPTIONAL,-- Need N
   srs-PosResourceToReleaseList-r16   SEQUENCE (SIZE(1..maxNrofSRS-PosResources-
r16)) OF SRS-PosResourceId-r16 OPTIONAL,-- Need N
   srs-PosResourceToAddModList-r16   SEQUENCE (SIZE(1..maxNrofSRS-PosResources-
r16)) OF SRS-PosResource-r16 OPTIONAL -- Need N
   ]]
}
SRS-ResourceSet ::=       SEQUENCE {
   srs-ResourceSetId       SRS-ResourceSetId,
   srs-ResourceIdList      SEQUENCE (SIZE(1..maxNrofSRS-ResourcesPerSet)) OF
SRS-ResourceId OPTIONAL, -- Cond Setup
   resourceType         CHOICE {
     aperiodic          SEQUENCE {
       aperiodicSRS-ResourceTrigger  INTEGER (1..maxNrofSRS-TriggerStates-1),
       csi-RS          NZP-CSI-RS-ResourceId      OPTIONAL, --
Cond NonCodebook
       slotOffset        INTEGER (1..32)         OPTIONAL, --
Need S
       ...,
       [[
       aperiodicSRS-ResourceTriggerList  SEQUENCE (SIZE(1..maxNrofSRS-
TriggerStates-2))
                       OF INTEGER (1..maxNrofSRS-TriggerStates-1)
OPTIONAL -- Need M
       ]]
     },
     semi-persistent        SEQUENCE {
       associatedCSI-RS       NZP-CSI-RS-ResourceId
OPTIONAL, - Cond NonCodebook
       ...
     },
     periodic           SEQUENCE {
       associatedCSI-RS       NZP-CSI-RS-ResourceId
OPTIONAL, -- Cond NonCodebook
       ...
     }
   },
   usage            ENUMERATED {beamManagement, codebook, nonCodebook,
antennaSwitching},
   alpha            Alpha             OPTIONAL, -- Need S
   p0             INTEGER (-202..24)        OPTIONAL, --
Cond Setup
   pathlossReferenceRS       PathlossReferenceRS-Config
OPTIONAL, -- Need M
   srs-PowerControlAdjustmentStates  ENUMERATED { sameAsFci2,
separateClosedLoop}         OPTIONAL, -- Need S
   ...,
   [[
   pathlossReferenceRS-List-r16    SEQUENCE (SIZE(1..maxNrofSRS-
PathlossReferenceRS-r16-1)) OF PathlossReferenceRS-Config
                                                   OPTIONAL -- Need M
   ]]
}
PathlossReferenceRS-Config ::=   CHOICE {
   ssb-Index          SSB-Index,
   csi-RS-Index         NZP-CSI-RS-ResourceId
}
SRS-PosResourceSet-r16 ::=       SEQUENCE {
   srs-PosResourceSetId-r16      SRS-PosResourceSetId-r16,
   srs-PosResourceIdList-r16     SEQUENCE (SIZE(1..maxNrofSRS-ResourcesPerSet))
OF SRS-PosResourceId-r16                OPTIONAL, -- Cond Setup
   resourceType-r16         CHOICE {
     aperiodic-r16          SEQUENCE {
```

TABLE 11-continued

```
        aperiodicSRS-ResourceTriggerList-r16   SEQUENCE (SIZE(1..maxNrofSRS-
TriggerStates-1))
                                        OF INTEGER (1..maxNrofSRS-TriggerStates-1)
OPTIONAL, -- Need M
        slotOffset-r16                  INTEGER (1..32)                 OPTIONAL, --
Need S
        ...
    },
    semi-persistent-r16                 SEQUENCE {
        ...
    },
    periodic-r16                        SEQUENCE {
        ...
    }
  },
  alpha-r16                             Alpha                           OPTIONAL, -- Need S
  p0-r16                                INTEGER (-202..24)              OPTIONAL, --
Cond Setup
  pathlossReferenceRS-Pos-r16           CHOICE {
    ssb-Index-16                            SSB-Index,
    csi-RS-Index-r16                        NZP-CSI-RS-ResourceId,
    ssb-r16                                 SSB-InfoNcell-r16,
    dl-PRS-r16                              DL-PRS-Info-r16
  }                                                                     OPTIONAL, -- Need M
  ...
}
SRS-ResourceSetId ::=                   INTEGER (0..maxNrofSRS-ResourceSets-1)
SRS-PosResourceSetId-r16 ::=            INTEGER (0..maxNrofSRS-PosResourceSets-1-r16)
SRS-Resource ::=                        SEQUENCE {
  srs-ResourceId                        SRS-ResourceId,
  nrofSRS-Ports                         ENUMERATED {port1, ports2, ports4},
  ptrs-PortIndex                        ENUMERATED {n0, n1 }
OPTIONAL, -- Need R
  transmissionComb                          CHOICE {
    n2                                  SEQUENCE {
      combOffset-n2                         INTEGER (0..1),
      cyclicShift-n2                        INTEGER (0..7)
    },
    n4                                  SEQUENCE {
      combOffset-n4                         INTEGER (0..3),
      cyclicShift-n4                        INTEGER (0..11)
    }
  },
  resourceMapping                       SEQUENCE {
    startPosition                           INTEGER (0..5),
    nrofSymbols                             ENUMERATED {n1, n2, n4},
    repetitionFactor                        ENUMERATED {n1, n2, n4}
  },
  freqDomainPosition                    INTEGER (0..67),
  freqDomainShift                       INTEGER (0..268),
  freqHopping                           SEQUENCE {
    c-SRS                               INTEGER (0..63),
    b-SRS                               INTEGER (0..3),
    b-hop                               INTEGER (0..3)
  },
  groupOrSequenceHopping                ENUMERATED { neither, groupHopping,
sequenceHopping },
  resourceType                          CHOICE {
    aperiodic                           SEQUENCE {
      ...
    },
    semi-persistent                     SEQUENCE {
      periodicityAndOffset-sp      SRS-PeriodicityAndOffset,
      ...
    },
    periodic                            SEQUENCE {
      periodicityAndOffset-p       SRS-PeriodicityAndOffset,
      ...
    }
  },
  sequenceId                            INTEGER (0..1023),
  spatialRelationInfo                     SRS-SpatialRelationInfo       OPTIONAL, --
Need R
  ...,
  [[
  resourceMapping-r16                   SEQUENCE {
    startPosition-r16                       INTEGER (0..13),
    nrofSymbols-r16                         ENUMERATED {n1, n2, n4},
    repetitionFactor-r16                    ENUMERATED {n1, n2, n4}
  }                                                                     OPTIONAL -- Need R
```

TABLE 11-continued

```
     ]]
}
SRS-PosResource-r16::=              SEQUENCE {
   srs-PosResourceId-r16               SRS-PosResourceId-r16,
   transmissionComb-r16                CHOICE {
      n2-r16                           SEQUENCE {
         combOffset-n2-r16                INTEGER (0..1),
         cyclicShift-n2-r16               INTEGER (0..7)
      },
      n4-r16                           SEQUENCE {
         combOffset-n4-16                 INTEGER (0..3),
         cyclicShift-n4-r16               INTEGER (0..11)
      },
      n8-r16                           SEQUENCE {
         combOffset-n8-r16                INTEGER (0..7),
         cyclicShift-n8-r16               INTEGER (0..5)
      },
      ...
   },
   resourceMapping-r16                 SEQUENCE {
      startPosition-r16                   INTEGER (0..13),
      nrofSymbols-r16                     ENUMERATED {n1, n2, n4, n8, n12}
   },
   freqDomainShift-r16                 INTEGER (0..268),
   freqHopping-r16                     SEQUENCE {
      c-SRS-r16                           INTEGER (0..63)
   },
   groupOrSequenceHopping-r16       ENUMERATED { neither, groupHopping,
sequenceHopping },
   resourceType-r16                    CHOICE {
      aperiodic-r16                       SEQUENCE {
         ...
      },
      semi-persistent-r16                 SEQUENCE {
         periodicityAndOffset-sp-r16         SRS-PeriodicityAndOffset-r16,
         ...
      },
      periodic-r16                        SEQUENCE {
         periodicityAndOffset-p-r16          SRS-PeriodicityAndOffset-r16,
         ...
      }
   },
   sequenceId-r16                      INTEGER (0..65535),
   spatialRelationInfoPos-r16       SRS-SpatialRelationInfoPos-r16
OPTIONAL, -- Need R
   ...
}
SRS-SpatialRelationInfo ::= SEQUENCE {
   servingCellId              ServCellIndex              OPTIONAL, -- Need
S
   referenceSignal            CHOICE {
      ssb-Index                  SSB-Index,
      csi-RS-Index               NZP-CSI-RS-ResourceId,
      srs                        SEQUENCE {
         resourceId                 SRS-ResourceId,
         uplinkBWP                  BWP-Id
      }
   }
}
SRS-SpatialRelationInfoPos-r16 ::= SEQUENCE {
   servingCellId-r16          ServCellIndex     OPTIONAL, -- Need S
   referenceSignal-r16        CHOICE {
      ssb-IndexServing-r16       SSB-Index,
      csi-RS-IndexServing-r16    NZP-CSI-RS-ResourceId,
      srs-SpatialRelation-r16    SEQUENCE {
         resourceSelection-r16      CHOICE {
            srs-ResourceId-r16         SRS-ResourceId,
            srs-PosResourceId-r16   SRS-PosResourceId-r16
         },
         uplinkBWP-r16              BWP-Id
      },
      ssbNcell-r16               SSB-InfoNcell-r16,
      dl-PRS-r16                 DL-PRS-Info-r16
   }
}
SSB-Configuration-r16 ::=     SEQUENCE {
   carrierFreq-r16            ARFCN-ValueNR,
   halfFrameIndex-r16            ENUMERATED {zero, one},
   ssbSubcarrierSpacing-r16      SubcarrierSpacing,
   ssb-periodicity-r16           ENUMERATED { ms5, ms10, ms20, ms40, ms80, ms160,
```

TABLE 11-continued

```
spare2,spare1 } OPTIONAL, --Need S
    smtc-r16                    SSB-MTC                 OPTIONAL, --
Need S
    sfn-Offset-r16              INTEGER (0..maxNrofFFS-r16),
    sfn-SSB-Offset-r16              INTEGER (0..15),
    ss-PBCH-BlockPower-r16              INTEGER (-60..50)
OPTIONAL -- Cond Pathloss
}
SSB-InfoNcell-r16 ::=           SEQUENCE {
    physicalCellId-r16          PhysCellId,
    ssb-IndexNcell-r16          SSB-Index,
    ssb-Configuration-r16           SSB-Configuration-r16
OPTIONAL -- Need M
}
DL-PRS-Info-r16 ::=             SEQUENCE {
    trp-Id-r16                  INTEGER (0..255),
    dl-PRS-ResourceSetId-r16            INTEGER (0..7),
    dl-PRS-ResourceId-r16           INTEGER (0..63)
OPTIONAL -- Cond Pathloss
}
SRS-ResourceId ::=                      INTEGER (0..maxNrofSRS-Resources-1)
SRS-PosResourceId-r16 ::=               INTEGER (0..maxNrofSRS-PosResources-1-r16)
SRS-PeriodicityAndOffset ::=    CHOICE {
    sl1                         NULL,
    sl2                         INTEGER(0..1),
    sl4                         INTEGER(0..3),
    sl5                         INTEGER(0..4),
    sl8                         INTEGER(0..7),
    sl10                        INTEGER(0..9),
    sl16                        INTEGER(0..15),
    sl20                        INTEGER(0..19),
    sl32                        INTEGER(0..31),
    sl40                        INTEGER(0..39),
    sl64                        INTEGER(0..63),
    sl80                        INTEGER(0..79),
    sl160                       INTEGER(0..159),
    sl320                       INTEGER(0..319),
    sl640                       INTEGER(0..639),
    sl1280                      INTEGER(0..1279),
    sl2560                      INTEGER(0..2559)
}
SRS-PeriodicityAndOffset-r16 ::=    CHOICE {
    sl1                         NULL,
    sl2                         INTEGER(0..1),
    sl4                         INTEGER(0..3),
    sl5                         INTEGER(0..4),
    sl8                         INTEGER(0..7),
    sl10                        INTEGER(0..9),
    sl16                        INTEGER(0..15),
    sl20                        INTEGER(0..19),
    sl32                        INTEGER(0..31),
    sl40                        INTEGER(0..39),
    sl64                        INTEGER(0..63),
    sl80                        INTEGER(0..79),
    sl160                       INTEGER(0..159),
    sl320                       INTEGER(0..319),
    sl640                       INTEGER(0..639),
    sl1280                      INTEGER(0..1279),
    sl2560                      INTEGER(0..2559),
    sl5120                      INTEGER(0..5119),
    sl10240                     INTEGER(0..10239),
    sl40960                     INTEGER(0..40959),
    sl81920                     INTEGER(0..81919),
    ...
}
-- TAG-SRS-CONFIG-STOP
-- ASN1STOP
```

Tables 12 to 16 below describe the information included in Table 11.

TABLE 12

SRS-Config field descriptions tpc-Accumulation
If the field is absent UE applies TPC commands via accumulation If disabled UE applies the TPC

TABLE 12-continued

SRS-Config field descriptions command without accumulation (this applies to SRS when a separate closed loop is configured for SRS) (see TS 38.213 [13], clause 7.3)

TABLE 13

SRS-Resource field descriptions cyclicShift-n2
Cyclic shift configuration (see TS 38.214 [19], clause 6.2.1).
cyclicShift-n4
Cyclic shift configuration (see TS 38.214 [19], clause 6.2.1).
freqHopping
Includes parameters capturing SRS frequency hopping (see TS 38.214 [19], clause 6.2.1).
groupOrSequenceHopping
Parameter(s) for configuring group or sequence hopping (see TS 38.211 [16], clause 6.4.1.4.2).
periodicityAndOffset-p
Periodicity and slot offset for this SRS resource. All values in "number of slots" sl1 corresponds to a periodicity of 1 slot, value sl2 corresponds to a periodicity of 2 slats, and so on. For each periodicity the corresponding offset is given in number of slots. For periodicity sl1 the offset is 0 slots (see TS 38.214 [19], clause 6.2.1).
periodicityAndOffset-sp
Periodicity and slot offset for this SRS resource. All values in "number of slots" sl1 corresponds to a periodicity of 1 slot, value sl2 corresponds to a periodicity of 2 slots, and so on. For each periodicity the corresponding offset is given in number of slots. For periodicity sl1 the offset is 0 slots (see TS 38.214 [19], clause 6.2.1).
ptrs-Portindex
The PTRS port index for this SRS resource for non-cociebook based UL MIMO. This is only applicable when the corresponding PTRS-UplinkConfig is set to CP-OFDM. The ptrs-Portindex configured here must be smaller than or equal to the maxNnrofPorts configured in the PTRS-UplinkConfig (see TS 38.214 [19], clause 6.2.3.1).
resourceMapping
OFDM symbol location of the SRS resource within a slot including number of OFDM symbols (N = 1, 2 or 4 per SRS resource), startPosition (SRSSymbolStartPosition = 0..5; "0" refers to the last symbol, "1" refers to the second last symbol) and RepetitionFactor (r = 1, 2 or 4) (see TS 38.214 [19], clause 6.2.1 and TS 38.211 [16], clause 6.4.1.4). The configured SRS resource does not exceed the slot boundary.
resource Type
Periodicity and offset for semi-persistent and periodic SRS resource (see TS 38.214 [19], clause 6.2.1).
sequenceId
Sequence ID used to initialize pseudo random group and sequence hopping (see TS 38.214 [19], clause 6.2.1).
spatialRelationInfo
Configuration of the spatial relation between a reference RS and the target SRS. Reference RS can be SSB/CSI-RS/SRS (see TS 38.214 [19], clause 6.2.1).
transmissionComb
Comb value (2 or 4) and comb offset (0..combValue−1) (see TS 38.214 [19], clause 6.2.1).

TABLE 14

SRS-ResourceSet field descriptions alpha
alpha value for SRS power control (see TS 38.213 [13], clause 7.3). When the field is absent the UE applies the value 1.
aperiodicSRS-ResourceTriggerList
An additional list of DCI "code points" upon which the UE shall transmit SRS according to this SRS resource set configuration (see TS 38.214 [19], clause 6.1.1.2).
aperiodicSRS-Resource Trigger
The DCI "code point" upon which the UE shall transmit SRS according to this SRS resource set configuration (see TS 38.214 [19], clause 6.1.1.2).
associatedCSI-RS
ID of CSI-RS resource associated with this SRS resource set in non-codebook based operation (see TS 38.214 [19], clause 6.1.1.2).
csi-RS
ID of CSI-RS resource associated with this SRS resource set. (see TS 38.214 [19], clause 6.1.1.2).
p0
P0 value for SRS power control. The value is in dBm. Only even values (step size 2) are allowed (see TS 38.213 [13], clause 7.3).
pathlossReferenceRS
A reference signal (e.g. a CSI-RS config or a SS block) to be used for SRS path loss estimation (see TS 38.213 [13], clause 7.3).
resourceType
Time domain behavior of SRS resource configuration. Corresponds to L1 parameter 'SRS-ResourceConfigType' (see TS 38.214 [19], clause 6.2.1). The network configures SRS resources in the

TABLE 14-continued

SRS-ResourceSet field descriptions same resource set with the same time domain behavior on periodic, aperiodic and semi-persistent SRS.
slotOffset
An offset in number of slots between the triggering DCI and the actual transmission of this SRS-ResourceSet. If the field is absent the UE applies no offset (value 0).
srs-PowerControlAdjustmentStates
Indicates whether hsrs,c(i) = fc(i,1) or hsrs,c(i) = fc(i,2) (if twoPUSCH-PC-AdjustmentStates are configured) or serarate close loop is configured for SRS. This parameter is applicable only for UIs on which UE also transmits PUSCH. If absent or release, the UE applies the value sameAs-Fci1 (see TS 38.213 [13], clause 7.3).
srs-ResourceIdList
The IDs of the SRS-Resources used in this SRS-ResourceSet. If this SRS-ResourceSet is configured with usage set to codebook, the srs-ResourceIdList contains at most 2 entries. If this SRS-ResourceSet is configured with usage set to nonCodebook, the srs-ResourceIdList contains at most 4 entries.
srs-ResourceSetId
The ID of this resource set. It is unique in the context of the BWP in which the parent SRS-Config is defined.
usage
Indicates if the SRS resource set is used for beam management, codebook based or non-codebook based transmission or antenna switching. See TS 38.214 [19], clause 6.2.1.

TABLE 15

| Conditional Presence | Explanation |
| --- | --- |
| Setup | This field is mandatory present upon configuration of SRS-ResourceSet or SRS-Resource and optional (Need M) otherwise. |
| NonCodebook | This field is optionally present, Need M, in case of non-codebook based transmission, otherwise the field is absent. |

An SRS resource for UE positioning may be configured/indicated to have features of cross-correlation and/or side-lobes, that is, to have a staggered RE pattern in which the side-peak is small. In the staggered RE pattern, respective symbols of the SRS resource may be configured in a Comb-N type frequency RE pattern. In the present disclosure, Comb-N or N-comb is a comb-shaped frequency RE pattern or form, where N in Comb-N denotes a comb-size, and may be set to a value by RRC signaling. For example, N may be greater than or equal to 1 and be set to any one of 2, 4, and 8, but is not limited thereto. In the Comb-N form having a size N, an SRS resource RE may be configured/indicated or allocated per RE for every N frequency REs in one symbol. Also, in the present disclosure, a comb-offset represents a frequency RE offset value in a specific SRS symbol, and may be 0 to N−1. The comb-offset may be used to determine a start position in the frequency domain of at least one RE (e.g., SRS RE) configured in the Comb-N form.

In brief, the Comb-N form may be a pattern in which REs are allocated at intervals of N from the RE having the lowest frequency index, that is, the start position of the REs in the frequency domain, based on one symbol.

Also, in the present disclosure, the comb-type may represent various types that a set of SRS symbols having different comb-offsets may have.

In an SRS resource, different SRS symbols having a Comb-N form may have different comb-offsets, that is, frequency RE offsets. Accordingly, for a plurality of SRS symbols, the SRS may be mapped to a larger number of subcarriers than the number of subcarriers to which the SRS is mapped in a specific symbol. For example, in the case of Comb-2, different comb-offsets are set for two symbols, and accordingly only 6 subcarriers are used for SRS mapping in a symbol. However, considering both symbols, a staggered RE pattern using all 12 subcarriers is formed.

As described above, in the case of SRS resource(s) and/or SRS resource set(s) configured for UE positioning, a single SRS resource occupying a plurality of symbols may be configured in a Comb-N type frequency RE pattern in a specific symbol, and may be configured in a staggered frequency RE pattern having different comb-offsets over several symbols. In this case, the following various examples may be considered to reduction signaling overhead for backward compatibility and SRS resource configuration.

Example 1 in Section 3.1

According to Example 1 of the present disclosure, the UE may use a comb-offset (i.e., a frequency RE offset) set/indicated for each SRS resource as a reference offset (e.g., a comb-offset for the first symbol of the configured SRS resource), and a relative comb-offset for a Comb-N type frequency RE pattern configured in another symbol may be set for/indicated to the UE. Here, the comb-offset used as the reference offset may be a single comb-offset for which only one value is set/indicated. For the relative comb-offset, one or more values may be set/indicated.

For example, when an SRS resource to which four OFDM symbols are allocated is configured/indicated in a Comb-4 form, the comb-offset of the SRS resource may be indicated/set as 0 for the UE, and a relative comb-offset and/or a relative frequency RE offset may be indicated/set as 1 for a Comb-4 type frequency RE pattern configured in another symbol. Based on the set/indicated single comb-offset and relative comb-offset, the UE may recognize the comb-offset of the first symbol occupied by the SRS resource as 0 and recognize the comb-offsets of the second, third and fourth symbols—as 1, 2, and 3 (or 3, 2, an d1), respectively. Additionally/alternatively, such setting/indication may be automatically recognized.

alternatively, as another implementation of Example 1, based the relative comb-offset and the comb-offset value indicated by RRC signaling (and/or set/indicated for the first symbol among the symbols allocated to the SRS resource), the comb-offset value for each symbol, that is, the start position in the frequency domain of the SRS RE, may be indirectly set/indicated/determined through the modulo operation. For example, when a frequency RE pattern of the SRS resource is configured/indicated as Comb-N, a comb-offset for each symbol may be set/indicated by Equation 5 below.

(CombOffset+RelativeOffset($i$)) mod $N$ [Equation 5]

Here, CombOffset denotes the above-described comb-offset value, RelativeOffset denotes the above-described relative comb-offset value, and i is $i \in \{1, 2, \ldots\}$, which denotes the i-th symbol from the start symbol of the configured SRS resource. That is, the relative comb-offset may differ among OFDM symbols. In other words, since the relative comb-offset is set/indicated for Comb-N as described above, it may be considered to be obtained based on Comb-N and OFDM symbols.

CombOffset have a value set/indicated by the BS/location server. As described above, it is a comb-offset for a specific symbol of the SRS, that is, a frequency RE offset, or a comb-offset value set/indicated to determine a comb-offset for each symbol. For example, CobmOffset may be a comb-offset value (frequency RE offset value) for the first or last OFDM symbol among M (>–1) OFDM symbol(s) to which a specific SRS resource is allocated. When CombOffset is the comb-offset value for the first symbol, the comb-offset of the first symbol may be determined to be a separately set/indicated comb-offset value (and/or a comb-offset value set/indicated together for SRS resource configuration).

The relative comb-offset, which is RelativeOffset (i), may be set/indicated or defined/considered as 0 when i=1. Accordingly, when the relative comb-offset is set/indicated as L, the UE may recognize that the relative comb-offset is indicated as L, 2L, 3L, and the like from i=2 except for the case of i=1. Here, L may be a relative comb-offset value for the second symbol. That is, in one implementation of the present disclosure, only the relative comb-offset value for the second symbol may be set/indicated to the UE, and the relative comb-offset values for the remaining symbols may be indirectly set/indicated based thereon.

In other words, the UE may be assigned one CombOffset and one RelativeOffset set/indicated in Equation 5 by the BS/location server, and set/interpret the RelativeOffset to/as a different value according to the index of an SRS symbol based on a specific rule (e.g., the symbol order located first in the time domain) according to the index of the value obtained by taking values equal to, twice, three times, and the like the set/indicated value of RelativeOffset may be interpreted as relative comb-offset values for the respective symbols in ascending order of positions thereof in the time domain).

Equation 5 may be embodied as Equation 6 below.

(CombOffset+RelativeOffset×($l_{index}$−$l_{start}$)) mod $N$=$O_{comb}(l_{index})$ [Equation 6]

Here, $O_{COmb}(l_{index})$ denotes a comb-offset (frequency RE offset) for a specific symbol index $l_{index}$ among OFDM symbol(s) occupied by a specific SRS resource, $l_{start}$ is an index to the first OFDM symbol positioned first in the time domain among the OFDM symbols occupied by an SRS resource for positioning in a slot in which the PRS resource, that is, the SRS resource, is configured, and may be set/indicated to the UE by the BS/location server/LMF, and $l_{index}$ denotes an index for the remaining OFDM symbols except for the first OFDM symbol among the OFDM symbols occupied by the SRS resource for positioning in the slot in which the PRS resource, that is, the SRS resource is configured.

As described above, the UE may determine/recognize the comb-offset for each symbol based on Equation 5 or 6 according to the set/indicated comb-offset value and relative comb-offset value.

For example, in the case of an SRS resource configured/indicated in the form of Comb-4 in 4 symbols, when the comb-offset for the first symbol is 3, and the relative comb-offset for the second symbol is set/indicated as 1, the UE may recognize that the relative comb-offsets for the third and fourth symbols are 2 and 3. Accordingly, the comb-offsets for the respective symbols may be set/indicated for the four symbols as follows.

Comb-offset for the first symbol: 3

Comb-offset for the second symbol: 3+1 mod 4=0

Comb-offset for the third symbol: 3+2 mod 4=1

Comb-offset for the fourth symbol: 3+3 mod 4=2

Figure 18:
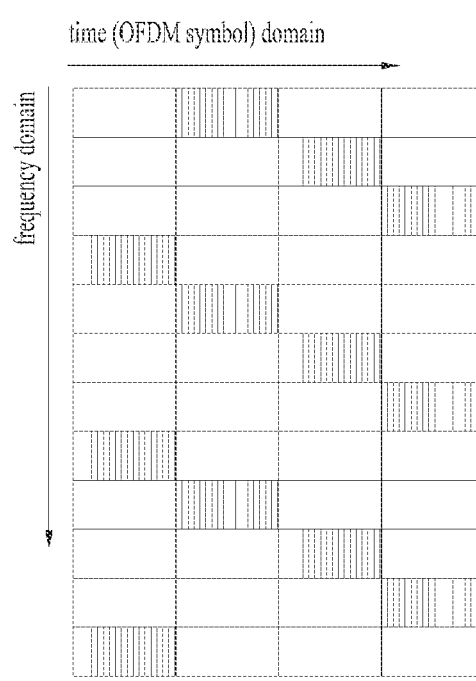
FIG. 18 illustrates SRS resource mapping of a Comb-4 type according to an example of the present disclosure.

FIG. 18 illustrates SRS resource mapping of a Comb-4 type according to an example of the present disclosure.

Referring to FIG. 18, in each symbol, REs may be mapped at intervals of comb size N (N=4) from the RE separated by the comb-offset value (3, 0, 1, 2) for each symbol from the RE that is positioned first in the frequency domain.

Alternatively, as another implementation of Example 1, a staggered RE pattern may be made for an SRS resource using only a single comb-offset (frequency RE offset) rather than using a plurality of frequency RE offset values for a plurality of symbols. Accordingly, signaling overhead may be reduced compared to the case where a comb-offset value is indicated/set for each symbol.

More specifically, for an SRS resource occupying M (>=1) OFDM symbols, only a single comb-offset value may be set/indicated to the UE by the BS/location server/LMF. In this case, the comb-offset value(s) for OFDM symbol(s) other than a specific OFDM symbol for which the comb-offset is set/indicated may be set/indicated based on a specific function. Specifically, when a comb-offset for the first OFDM symbol in the time domain of a single SRS resource occupying M OFDM symbols is set/indicated, the comb-offsets for the remaining M−1 OFDM symbols may be set/indicated based on a function defined by at least one of the following parameters.

Comb-offset value (frequency RE offset value) set/indicated for the SRS resource;

Comb size N set/indicated for the SRS resource;

Total number M of OFDM symbols occupied by the SRS resource;

Symbol indexes for OFDM symbols occupied by the SRS resource based on a slot.

More specifically, the comb-offset for the frequency RE pattern of a specific OFDM symbol (with index $l_{index}$) of the SRS resource may be set/indicated based on a function defined by at least one of the following parameters.

Comb-offset value (frequency RE offset value) set/indicated for the SRS resource;

Comb size N set/indicated for the SRS resource;

Total number M of OFDM symbols occupied by the SRS resource;

Index of the start OFDM symbol of the SRS resource (that is, the OFDM symbol positioned first in the time domain among the OFDM symbols to which the SRS resource is mapped).

Also, a function for determining the comb-offset value may be exemplarily defined by Equation 7 or Equation 8 below.

$$\left(O_{COmb}(l_{start}) + \left\lfloor \left(\frac{N}{M}\right) \times (l_{index} - l_{start}) \right\rfloor \right) \bmod N = O_{Comb}(l_{index}) \quad \text{[Equation 7]}$$

$$\left(O_{COmb}(l_{start}) + \left\lceil \left(\frac{N}{M}\right) \times (l_{index} - l_{start}) \right\rceil \right) \bmod N = O_{Comb}(l_{index}) \quad \text{[Equation 8]}$$

Here, mod denotes the modulo operation, and $O_{COmb}(l_{index})$ denotes a comb-offset (frequency RE offset) for a specific symbol index $l_{index}$ among OFDM symbol(s) occupied by a specific SRS resource and may be set/indicated to the UE by the BS/location server/LMF. $l_{start}$ is an index to the first OFDM symbol positioned first in the time domain among the OFDM symbols occupied by an SRS resource for positioning in a slot in which the PRS resource, that is, the SRS resource, is configured, and may be set/indicated to the UE by the BS/location server/LMF, and $l_{index}$ denotes an index for the remaining OFDM symbols except for the first OFDM symbol among the OFDM symbols occupied by the SRS resource for positioning in the slot in which the PRS resource, that is, the SRS resource is configured. N denotes the comb size, M denotes the total number of OFDM symbols occupied by the PRS resource (e.g., SRS resource) in a slot, $\lfloor A \rfloor$ denotes the maximum integer not greater than A, and $\lceil A \rceil$ is the smallest integer not less than A.

Some modifications or applications of Example 1 in Section 3.1 may also be within the scope of the present disclosure.

FIG. 19 is a flowchart illustrating an SRS resource transmission method of a BS/UE according to an example of the present disclosure. The order/steps in FIG. 19 may be changed, and each step may be independently performed.

Figure 19A:
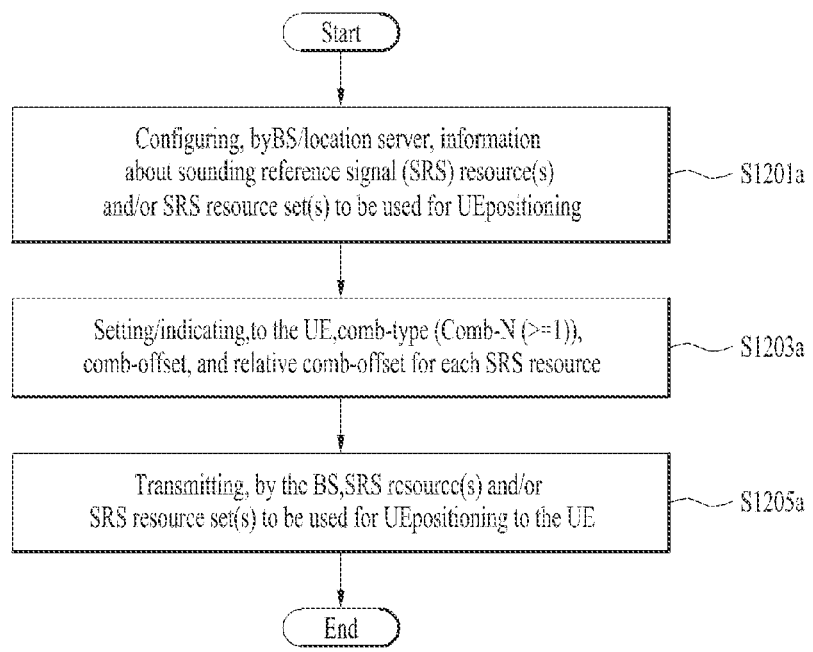
FIG. 19 is a flowchart illustrating an SRS resource transmission method for a base station/UE according to an example of the present disclosure.

Referring to FIG. 19A, in S1201a, the BS/location server may configure information about an SRS resource and/or an SRS resource set for positioning of a UE for the UE. In S1203a, the BS/location server may set/indicate, to the UE, the comb size N, comb-offset, and relative comb-offset for each SRS resource. In S1205a, the BS/location server may receive an SRS signal on the SRS resource and/or the SRS resource set configured for positioning based on the configured/indicated information.

Figure 19B:
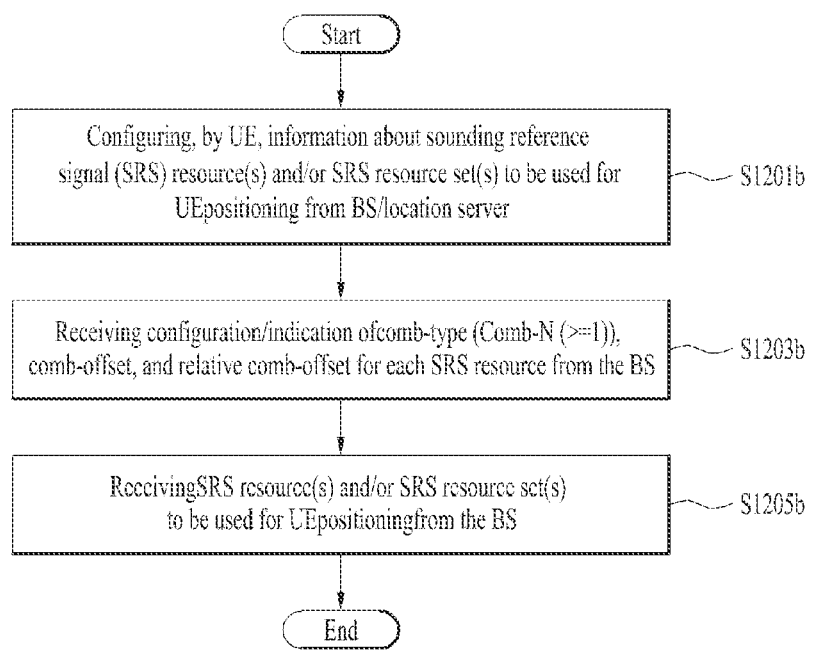

Referring to FIG. 19B, in S1201b, the UE may receive information about an SRS resource and/or an SRS resource set for positioning of the UE from the BS/location server. In S1203b, the UE may receive a comb size N, a comb-offset, and a relative comb-offset set/indicated for each SRS resource from the BS/location server. In S1205b, the UE may transmit an SRS signal on the SRS resource and/or the SRS resource set configured for the positioning, based on the configured/indicated information.

Example 2 in Section 3.1

According to Example 2 in Section 3.1 of the present disclosure, in order to use the SRS of a dedicated/predefined staggered RE pattern for UE positioning, different staggered RE patterns/types may be predefined or preconfigured according to the comb-types, and a specific one of the predefined or preconfigured patterns/types may be configured for/indicated to the UE. For example, the specific one pattern/type may be configured for/indicated to the UE based on the index.

Specifically, a rule for creating different types of staggered RE patterns of SRS resources to be used for UE positioning according to the comb-N type and/or the number of SRS symbols may be defined/configured for the UE.

Figure 20:
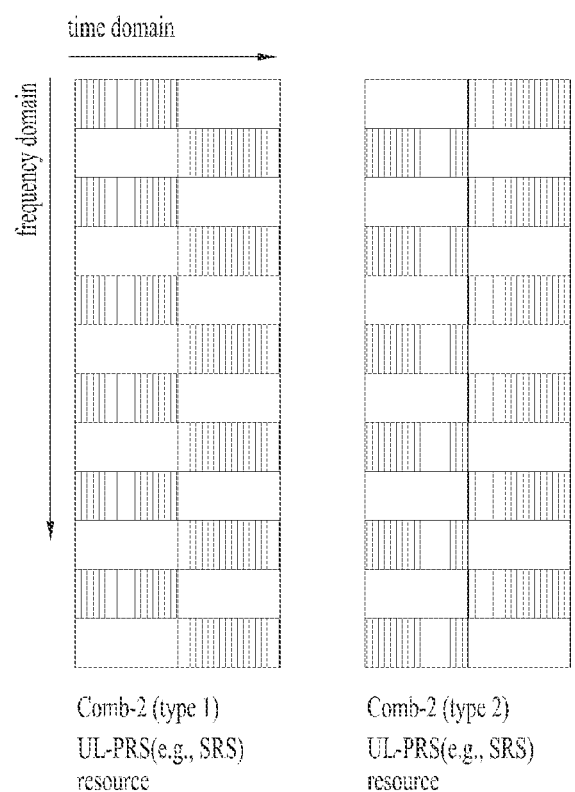
FIG. 20 illustrates a staggered RE pattern/type in a Comb-2 type according to an example of the present disclosure.

FIG. 20 illustrates a staggered RE pattern/type in a Comb-2 type according to an example of the present disclosure.

Referring to FIG. 20, for example, when Comb-2 type SRS symbols are configured in a frequency RE pattern, in order to indicate a comb-offset for each of two symbols while the comb-offset is set to 0 or 1, 1 bit is required for each symbol and 2 bits are required for the two symbols. Alternatively, the BS/location server may configure/indicate two different staggered RE patterns/types for the two SRS symbols. In Type 1, comb-offsets are set to 0 and 1 for two SRS symbols, respectively. In Type 2, comb-offsets are set to 1 and 0 for the two symbols, as opposed to Type 1, respectively. Accordingly, unlike indicating the comb-offset for each of the two symbols, the comb-offset for the two symbols may be set/indicated to the UE with 1-bit.

Figure 21:
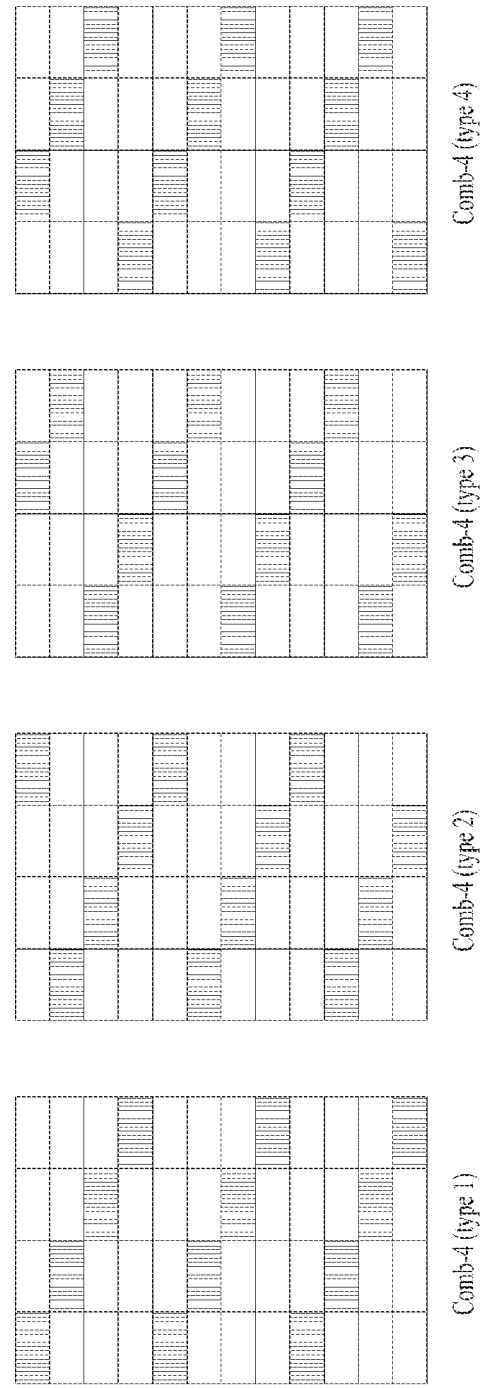
FIG. 21 illustrates a staggered RE pattern/type in a Comb-4 type according to an example of the present disclosure.

FIG. 21 illustrates a staggered RE pattern/type in a Comb-4 type according to an example of the present disclosure.

Referring to FIG. 21, for example, when Comb-4 type SRS symbols are configured in a frequency RE pattern, the comb-offset may be set to, for example, 0, 1, 2, or 3, and accordingly, 2 bits are required for each symbol. That is, 8 bits are required for the 4 symbols. Accordingly RRC signaling overhead may increase unnecessarily considering the need to configure a large number of UEs, and/or a plurality of SRS resources and/or resource sets, RRC signaling overhead may be excessively increased. In the present disclosure, 4 types may be defined or configured for an SRS resource allocated to 4 symbols and mapped in a Comb-4 pattern, and one of the 4 types may be configured for/indicated to the UE. The UE may use the one configured/indicated type. In particular, the 4 types may be defined such that all resources are orthogonally used in terms of utilization of time-frequency resources. That is, as shown in FIG. 21, the 4 types may be defined such that at least one SRS RE is mapped to each of the subcarriers (e.g., 12 subcarriers) to which the SRS resource is mapped in each type. These types may be configured for/indicated to the UE as SRS resource patterns. For example, the BS may indicate/configure not only the information about Comb-N of a specific SRS resource and symbol number information, but also type information about the SRS resource pattern to the UE. Examples of comb-offsets for each Comb-4 type-based staggered RE pattern/type (among the 4 staggered RE patterns/types) may be given as follows:

Comb-offsets for respective symbols in type 1 (staggered RE pattern #1): 0, 1, 2, 3;
Comb-offsets for respective symbols in type 2 (staggered RE pattern #2): 1, 2, 3, 0;
Comb-offsets for respective symbols in type 3 (staggered RE pattern #3): 2, 3, 0, 1;
Comb-offsets for respective symbols in type 4 (staggered RE pattern #4): 3, 0, 1, 2.

Modifications/extensions of the above-described examples of the present disclosure may also be within the scope of the present disclosure. For example, the comb-offset for each symbol in each type may be defined or set to a value different from those disclosed in the above examples, and accordingly, it should be considered that creating staggered RE patterns different from those in the above examples is also within the scope of the present disclosure.

Example 3 in Section 3.1

According to Example 3 in Section 3.1 of the present disclosure, in order to configure/indicate specific one or more patterns among different staggered RE patterns (from a set of Comb-N-based staggered RE patterns) to the UE, SRS resource configuration parameters (e.g., RRC parameters) may be extended/applied/reused. For example, parameters/signaling for comb-offset setting among SRS resource configuration parameters may be extended/applied/reused. Additionally/alternatively, to allow the SRS resource configuration parameters to be applied/extended/reused, for example, to allow the parameter for the comb-offset setting to be used for configuring/indicating a staggered RE pattern, a set of staggered RE patterns may be defined or configured in connection with the SRS resource configuration parameters. For example, different orthogonal staggered RE patterns may be defined or configured to allow different UEs to use orthogonal time-frequency radio resources. In this case, the comb-offset for a specific symbol in any one staggered RE pattern may be a value set/indicated by the BS, or may be operatively connected thereto.

For example, when a plurality of staggered RE patterns composed of L (>=1) symbols is defined or configured, the staggered RE patterns may be defined orthogonally in terms of time-frequency. Accordingly, the comb-offset for a specific symbol may differ among the different staggered RE patterns. That is, if the staggered RE patterns are different, the comb-offsets for the specific symbol may also be different. Accordingly, the comb-offset for the Comb-N pattern of the first OFDM symbol of each staggered RE pattern may be used as a representative comb-offset for each staggered RE pattern. In other words, a single comb-offset set/indicated when the BS configures one SRS resource for the UE may be used as a representative comb-offset for the staggered RE pattern. Accordingly, for SRS resource(s) configured for the UE positioning (or SRS resource(s) included in the SRS resource set(s) configured for UE positioning), the UE may use a comb-offset value set/indicated by the BS to distinguish between multiple different staggered RE patterns. For example, the UE may recognize a comb-offset value set/indicated for a specific SRS resource as a comb-offset value for the first OFDM symbol in each staggered RE pattern.

More specifically, when 4 staggered RE patterns (a set of staggered RE patterns) are defined/configured in an SRS resource consisting of 4 Comb-4 type-based symbols, the UE may consider that the set/indicated comb-offset value is for Comb-4 configured in the first SRS symbol in any one staggered RE pattern, and may also recognize that an RE pattern of a specific type has been configured/indicated based on the value.

For example, the following four types may be configured/indicated for the UE.

Comb-offsets for respective symbols in type 1 (staggered RE pattern #1): 0, 1, 2, 3;
Comb-offsets for respective symbols in type 2 (staggered RE pattern #2): 1, 2, 3, 0;
Comb-offsets for respective symbols in type 3 (staggered RE pattern #3): 2, 3, 0, 1;
Comb-offsets for respective symbols in type 4 (staggered RE pattern #4): 3, 0, 1, 2.

In this case, when the comb-offset is set/indicated as 0 for the UE, the UE may recognize/determine that the RE pattern of the SRS resource, that is, the Comb-4 pattern is configured to be of type 1 because the type in which the comb-offset of the first symbol is 0 among the four staggered RE patterns is type 1. Alternatively, when the comb-offset is set/indicated as 2, the UE may recognize/determine that the Comb-4 pattern is configured in a form such as type 3 in which the comb-offset of the first symbol is 2.

Alternatively, in the present disclosure, for the SRS resource(s) for UE positioning, which are different from SRS resource(s) used for purposes than positioning, the comb-N type of the SRS resource and the number of symbols allocated to the SRS resource may be jointly configured/indicated.

For example, the SRS resource in which the frequency RE pattern is configured based on the Comb-N form may be composed of N OFDM symbols corresponding to the size of the comb, and may be configured/indicated such that at least one SRS RE is mapped to each of the subcarriers (e.g., 12 subcarriers) to which the SRS resource is mapped. For example, when the frequency RE pattern of a specific SRS resource is in the form of Comb-2, two symbols may be consecutively configured/indicated such that at least one SRS RE is mapped to each of the subcarriers in the RB. That is, when only the comb size N and the starting position of the symbol (SRS starting symbol index) are set/indicated, the UE may recognize implicitly that the staggered Comb-2 pattern is configured in two consecutive symbols from the starting position of the symbol. Here, the staggered RE pattern may mean that different comb-offsets are set in the first symbol and the second symbol as described above.

Some modifications or applications of Examples 2 and 3 in Section 3.1 of the present disclosure described above may also be within the scope of the present disclosure.

FIG. 22 is a flowchart illustrating an SRS resource transmission method of a base station/UE according to another example of the present disclosure. The order of the steps in FIG. 22 may be changed, and each step may be independently performed.

Figure 22A:
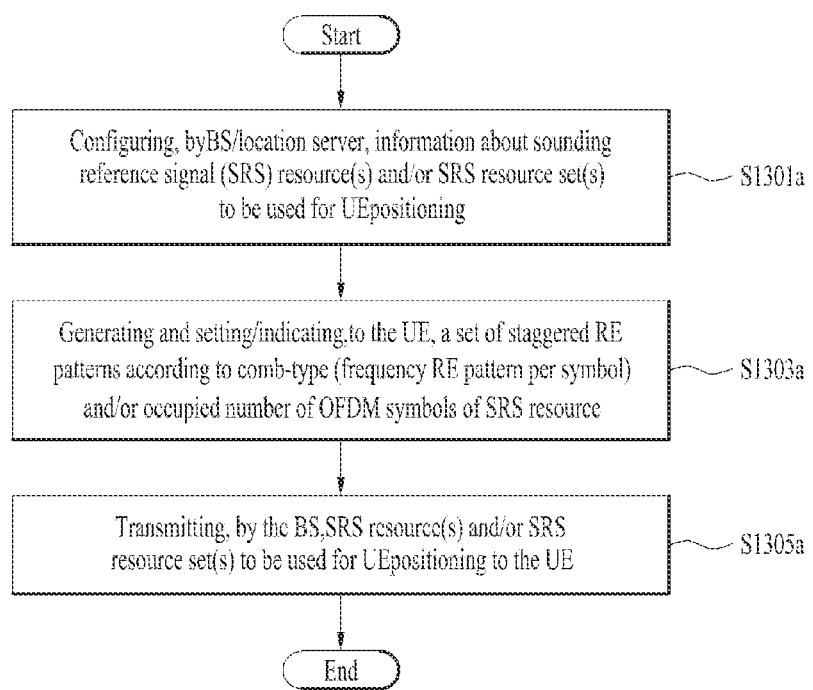
FIG. 22 is a flowchart illustrating an SRS resource transmission method for a base station/UE according to another example of the present disclosure.

Referring to FIG. 22A, in S1301a, the BS/location server may configure information about SRS resource(s) and/or SRS resource set(s) to be used for UE positioning. In S1303a, the BS/location server may generate staggered RE patterns based on the Comb-N type of the SRS resource and/or the number of OFDM symbols allocated to the SRS resource and configure/indicate the same to the UE. In S1305a, the BS/location server may receive an SRS signal on the SRS resource and/or the SRS resource set for positioning based on the configured/indicated information.

Figure 22B:
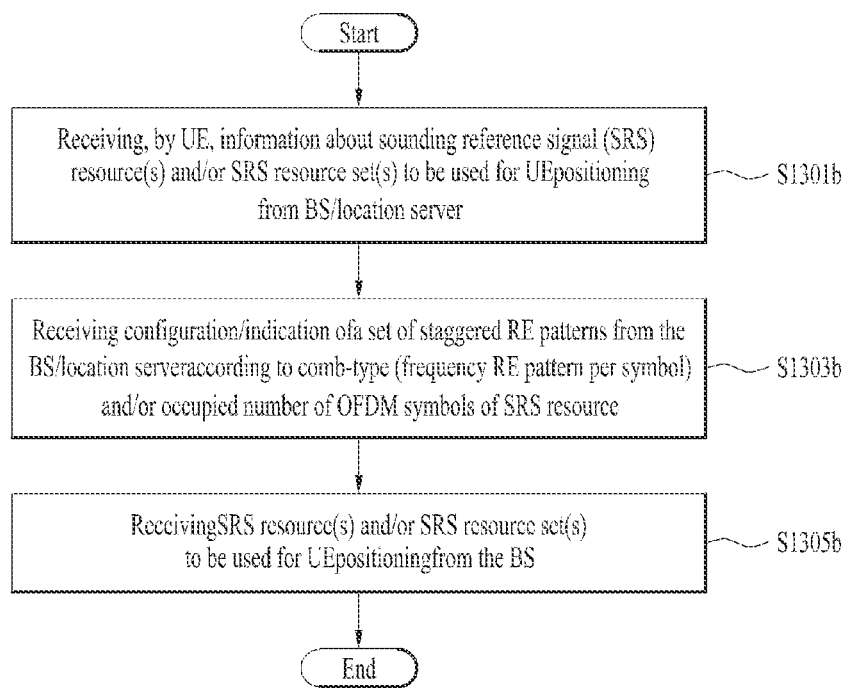

Referring to FIG. 22B, in S1301b, the UE may receive information about the SRS resource(s) and/or SRS resource set(s) to be used for UE positioning from the BS/location server. In S1303b, the UE may receive, from the BS/location server, configuration/indication of staggered RE patterns generated based on the Comb-N type of the SRS resource and/or the number of OFDM symbols allocated to the SRS resource. In S1305b, the UE may transmit an SRS signal on the SRS resource and/or the SRS resource set for positioning based on the configured/indicated information.

3.2. TX/RX Beam Configuration/Determination for NR Positioning

The SRS may be used as an uplink RS for UTDOA-based UE positioning.

Specifically, regarding UL SRS transmit power for positioning use, options 1 to 3 disclosed below may be considered.

Option 1: the UL SRS transmit power may be a constant (e.g., transmit power control may not be supported).
Option 2: the UL SRS transmit power may be determined based on an existing power control scheme.
Option 3: the UL SRS transmit power may be determined based on a modification of the existing power control scheme. For example, it may be supported to configure the DL RS of a neighboring cell used for measurement of SRS path loss.

Alternatively, the number of SRS symbols for positioning may be increased compared to {1, 2, 4}.

Alternatively, when the positions of the SRS symbol for positioning per slot are from the last symbol to the N previous symbols in the time domain within the slot, N may be greater than 6.

A specific SRS resource may be configured/indicated to the UE by the BS for the purpose of UE positioning. As an example, the BS may configure the resource for the UE through RRC signaling related to an SRS resource set (e.g., signaling indicating a use-case of the SRS resource set). The SRS resource used for UE positioning may have different characteristics from SRS resources used for other purposes.

In addition, in order to use the UTDOA-based UE positioning technique, multiple TRPs, and/or BSs (gNB/eNB, etc.), and/or location measurement unit (LMUs) are required to receive the SRS transmitted by the UE. Accordingly, unlike SRS transmission performed by the UE to the serving cell/gNB/TRP thereof as a target, it is necessary to transmit the SRS to a target neighboring cell/gNB/TRP other than the serving cell/gNB/TRP. To this end, disclosed herein are various examples related to a method for configuring/indicating TX/RX beam sweeping and a deterministic TX/RX beam for transmission/reception of RS (resource(s)) for positioning of the UE and BS/gNB/TRP.

Example 1 in Section 3.2

DL RS (e.g., PRS) resource(s) for UE positioning may be transmitted from multiple cell(s)/TRP(s)/gNB(s) such as a reference cell (or serving cell) and a neighboring cell. The UE needs to effectively receive the DL RS transmitted from several cell(s)/TRP(s)/gNB(s). Depending on the UE capability, when the UE receives a plurality of RS (e.g., PRS) resource(s) transmitted simultaneously from multiple cells/gNBs/TRPs, it may be allowed to use a plurality of reception beams optimized for the respective transmitted DL RS resources. Accordingly, in order to effectively receive RS resource(s) (e.g., PRS resource(s)) for positioning transmitted from two or more cells/gNBs/TRPs through one reception beam, it is necessary to use a reception beam that is optimized (i.e., not sharp) for reception of a plurality of RS resources.

Accordingly, in Example 1 in Section 3.2 of the present disclosure, in order to effectively receive DL RS resources using single or multiple RX beam(s) and/or to transmit SRS resource(s) and/or SRS resource set(s) intended for multiple cells/gNBs/TRPs through single or multiple TX beam(s) for the purpose of NR positioning, multiple DL RS resources transmitted from multiple cells may be used for reference of a UE beam direction, that is, a QCL source. RS resources transmitted from the respective cells/gNBs/TRPs may be configured together with corresponding cell/gNB/TRP information (e.g., TP/cell/gNB IDs) and may be explicitly configured/indicated to the UE. Accordingly, for multiple RS resource(s) configured as spatial QCL-D sources for specific SRS resource(s), the UE may identify a TP/TRP/cell to which each RS resource(s) is linked.

In other words, multiple RS (e.g., PRS/CSI-RS/SSB) resource(s) and/or a specific RS group (composed of, for example, CSI-RS resource(s) and SSB resource(s)) transmitted from multiple cells/TRPs/BSs) may be configured as a QCL-D source for a specific SRS resource of the UE. That is, the DL RS may be used as a QCL-D source for the specific SRS resource so as to be used as a reference for determining the direction of the reception beam.

Also, in order for the UE to send a specific SRS resource to two or more cells/gNBs/TRPs which are targets, the BS/LMF may need to provide reference information for configuration of the transmission direction of specific SRS resource(s) and/or SRS resource set(s) configured for the cells/gNBs/TRPs or a specific UE (for the purpose of UE positioning). To this end, the BS/LMF may configure/indicate the RS resource(s) transmitted from different cells/gNBs/TRPs as spatial QCL references for the specific SRS resource(s) and/or SRS resource set(s) of the specific UE (configured for UE positioning). That is, multiple RS resources transmitted by multiple cells/gNBs/TRPs may be configured/indicated as QCL-D sources of a specific SRS resource. In this case, the RS resource(s) transmitted by the different cells/gNBs/TRPs may be configured in association with a specific TRP/cell/gNB and explicitly configured/indicated to the UE.

For example, the wireless network (BS/LMF/location server) may indicated/configure, to/for a target UE within cell/gNB/TRP #3, RS resource #1 (e.g., SSB/CSI-RS/PRS resource #1), which is transmitted from cell/gNB/TRP #1, and RS resource #2 (e.g., SSB/CSI-RS/PRS resource #2), which is transmitted from cell/gNB/TRP #2, as reference information for a transmission beam direction for transmitting one or more specific UL-PRS (e.g., SRS) resource(s) configured (for UE positioning). That is, QCL-D sources for the one or more UL-PRS (e.g., SRS) resource(s) may be configured/indicated.

Example 2 in Section 3.2

According to Example 2 in Section 3.2 of the present disclosure, DL RS resource(s) and/or DL RS resource set(s) transmitted from a single TRP/cell/gNB may be used as reference information for a TX/RX beam for SRS resource set transmission containing one or more SRS resource(s). In particular, under the following conditions, the configuration/indication may be allowed to a limited extent.

- DL RS resource(s) and/or DL RS resource set(s) transmitted from a single TRP/cell/gNB may be limitedly configured/indicated as reference information for the TX/RX beam for transmission of the SRS resource set only when UL RS (e.g., SRS) resource(s) are configured for UE positioning. For example, this may be a case where the SRS resource set is designated/configured for UE positioning by the BS.
- All UL RS (e.g., SRS) resources may be defined/configured for the same transmit antenna port. That is, the UL RS resources may be transmitted based on the same beam and have the same TX antenna port. In addition, the UL RS resources may be configured/defined/indicated for UE positioning.

The BS/LMF/location server may configure/indicate, for/to the UE, specific DL RS (e.g., SSB, CSI-RS, PRS) resource(s) transmitted from a specific cell/gNB/TRP as reference beam direction information for transmission of specific SRS resource set(s) and/or SRS resource(s) (configured for UE positioning). For example, an SSB (or SS/PBCH block) configured for L1-RSRP and/or L3-RSRP measurement may be configured/indicated as reference beam direction information for SRS resource transmission. The UE may measure RSRP/SINR/SNR or the like for SSB resource(s) transmitted from a neighbor cell/gNB/TRP, and be instructed/configured by the BS to report SSB resource information having the greatest measured value to the BS or LMF. Accordingly, based on the SSB resource(s) information (e.g., SSB resource index, etc.) reported by the UE, the BS/LMF may configure/indicate, for/to the UE, the SSB resource having the greatest measured as a QCL-D source of the specific SRS resource(s) and/or SRS resource set(s). Alternatively, it may provide the UE with the SSB resource information as reference information for a TX beam direction of the UE that transmits the specific SRS resource(s) and/or SRS resource set(s).

In transmitting multiple SRS resources included in an SRS resource set (configured for UE positioning), the UE may transmit the SRS while performing TX beam sweeping within a specific angle/region based on the direction in which the SSB resource has been received. The cell/gNB/TRP/LMU, which is a reception terminal, selects an SRS resource corresponding to the minimum Time of Flight (ToF)/ToA/propagation time among the measured values acquired through multiple SRS resources transmitted by the UE, and may indicate the index of the selected/determined SRS resource to the UE. Then, based on the indicated index of the SRS resource, the UE may determine a reception beam direction to use for the UE to receive a PRS from the TRP/cell/gNB, and may then determine a transmission beam direction to use in transmitting an SRS later. That is, by indicating a specific SSB resource to the UE as reference information for determination of the transmission beam for the SRS resource set(s) including one or more specific SRS resource(s) and determining a transmission/reception beam pair corresponding to the minimum ToF/ToA/propagation time based on the indicated resource, RSTD measurement may be performed more accurately.

Figure 23:
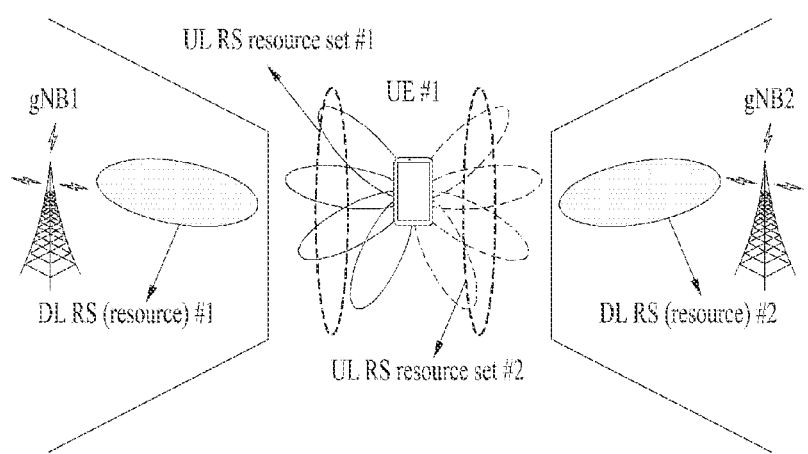
FIG. 23 illustrates beam sweeping according to an example of the present disclosure.

FIG. 23 illustrates beam sweeping according to an example of the present disclosure.

Referring to FIG. 23, DL RS resource #1 and DL RS resource #2 transmitted from gNB1 and gNB2, respectively, are configured/indicated as QCL-D sources for UL RS resource set (e.g., SRS resource set) #1 and UL RS resource set #2 of UE #1, respectively. In this case, when the UE transmits multiple RS resources included in UI RS resource set #1, the direction toward gNB2 may be excluded from the TX beam sweeping range. That is, when there is no QCL-D source, UE #1 needs to transmit SRS resources while performing beam sweeping omnidirectionally. Therefore, more efficient beam sweeping may be implemented.

Example 3 in Section 3.2

According to Example 3 in Section 3.2 of the present disclosure, a single DL RS resource transmitted from a specific cell/gNB/TRP may be configured/indicated by the BS as a resource having a spatial QCL relationship with multiple UL RS (e.g., SRS, UL-PRS) resources and/or a single SRS resource set. That is, a DL RS resource transmitted from a specific cell/gNB/TRP may be configured/indicated as a QCL-D source for multiple UL RS (e.g., SRS, UL-PRS) resources and/or a single SRS resource set. In addition, multiple DL RS resources transmitted from multiple TRP(s)/gNB(s)/cell(s) may be configured/indicated as QCL-D sources for multiple UL RS (e.g., SRS, UL-PRS) resources and/or a single SRS resource set. In addition, such configuration/indication may be performed only on the following limiting conditions.

The spatial QCL relationship that a single DL RS resource transmitted from a specific cell/gNB/TRP has with multiple UL RS (e.g., SRS, UL-PRS) resources and/or a single SRS resource set may be limitedly configured/indicated only when UL RS resource(s) are configured for UE positioning.

All UL RS (e.g., SRS) resources may be defined/configured for the same transmit antenna port. That is, they may have the same beam and the same TX antenna port. In addition, the UL RS resources may be configured/defined/indicated for UE positioning.

For example, when a target UE whose location need to be estimated intends to transmit an SRS to specific TRP(s)/gNB(s)/cell(s), an SRS supposed to be transmitted through a specific transmit antenna port may need to be repeatedly transmitted due to a long distance between the specific TRP(s)/gNB(s)/cell(s) and the target UE. Accordingly, a condition in which all UL RS resources are defined/configured for the same transmit antenna port may be considered. Thereby, hearability may be improved, and the TRP(s)/gNB(s)/cell(s), a specific reception terminal, acquire obtain a more accurate measured value of ToA (or relative timing of arrival (RToA).

Example 4 in Section 3.2

According to Example 4 in Section 3.2 of the present disclosure, the UE may receive configuration/indication of SRS resource(s) and/or SRS resource set(s) for the purpose of UE positioning (e.g., SRS for UTDOA) from a network (BS and/or LMF (or location server)). In this case, OFDM symbol(s) and transmit power (or parameters related to transmit power control) at through which SRS resource(s) are transmitted may be jointly configured/indicated.

For example, the SRS resource(s) configured for/indicated to the UE by the BS for UE positioning and/or the SRS resource(s) included in the SRS resource set configured for UE positioning) may be configured to always occupy all OFDM symbols included in the slot(s) in which the SRS resource(s) and/or SRS resource set(s) are transmitted, and it may be configured/indicated that the SRS is transmitted at the maximum transmit power that the UE is allowed to use in all symbols. That is, the slot in which the SRS is transmitted for UE positioning may be used as a dedicated slot (dedicated time-frequency resource) for SRS transmission.

Alternatively, it may be configured/indicated by the BS that, among the SRS resource(s) included in the SRS resource set configured for UE positioning, SRS resource(s) intended to be transmitted to the serving cell/TRP/gNB use a preset or predefined UL power control (see, for example, 3GPP TS 38.213, etc.) and SRS resource(s) intended to be transmitted to neighbor cell(s)/TRP(s)/gNB(s) always use the maximum power available to the UE. Here, an SRS (SRS resource(s) and/or SRS resource set(s)) intended to be transmitted to a serving cell/TRP/gNB and an SRS intended to be transmitted to serving cell(s)/TRP(s)/gNB(s) may be identified through QCL information about DL RS resource(s) indicated/configured by the BS/LMF in conjunction with a specific TRP/cell/gNB.

Alternatively, multiple DL RS resource(s) and/or resource set(s) may be configured for/indicated to the UE as QCL sources (e.g., QCL-D sources) for a specific UL RS (e.g., SRS) resource, and the UE may calculate the path loss for the multiple indicated/configured DL RS resource(s) in order to determine the transmit power for transmission of the specific UL RS resource, and determine the specific SRS transmit power based on the calculation result. For example, since the multiple RS resource(s) are transmitted from different TRP(s)/cell(s)/gNB(s), the UE may take the average of the path loss values for the multiple RS resource(s), may determine the transmit power for the SRS transmission based on the RS resource exhibiting the largest path loss. In addition, the BS/LMF may configure/indicate such operation of the UE.

In other words, the specific SRS resource set(s) configured for UE positioning and/or the SRS resource(s) included in the specific SRS resource set may have multiple RSs (RS resource(s)) transmitted from multiple cells/gNBs/TRPs as QCL sources. The BS may provide a configuration/indication to the UE such that the path losses for multiple RS resource(s) configured/indicated as QCL sources for the specific SRS resource are measured, and the UE determines the transmit power for the SRS resource based on the measured values. That is, spatial QCL configuration between the DL RS and the UL RS and power control for the UL RS may be jointly configured for/indicated to the UE by the BS.

Some modifications or applications of various examples in Section 3.2 of the present disclosure may also be within the scope of the present disclosure.

FIG. 24 is a flowchart illustrating an SRS resource transmission method of a base station/UE according to another example of the present disclosure.

Figure 24A:
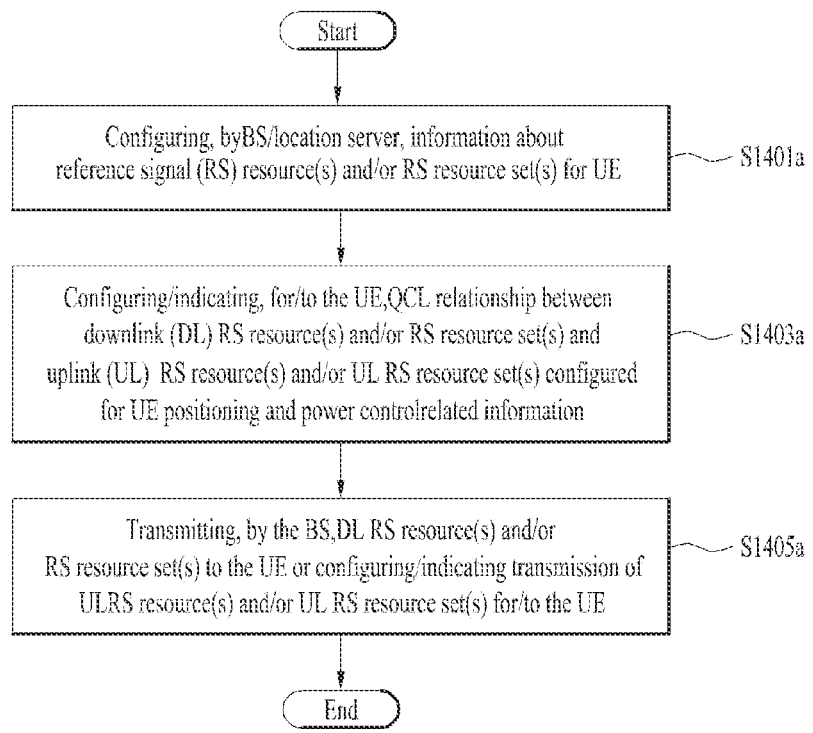
FIG. 24 is a flowchart illustrating an SRS resource transmission method for a base station/UE according to another example of the present disclosure.

Referring to FIG. 24A, in S1401a, the BS/location server may configure information about RS resource(s) and/or RS resource set(s) for the UE. For example, the RS may be an SRS for positioning. In S1403a, the BS/location server may configure/indicate, for/to the UE, QCL relationship between DL RS resource(s) and/or DL RS resource set(s) and UL RS resource(s) and/or UL RS resource set(s) configured for UE positioning and information about power control. In S1305a, based on the configured/indicated information, the BS/location server may transmit DL RS resource(s) and/or DL RS resource set(s), may configure/indicate transmission of UL RS resource(s) and/or UL RS resource set(s), or may receive an SRS signal on the UL RS resource(s) and/or UL RS resource set(s).

Figure 24B:
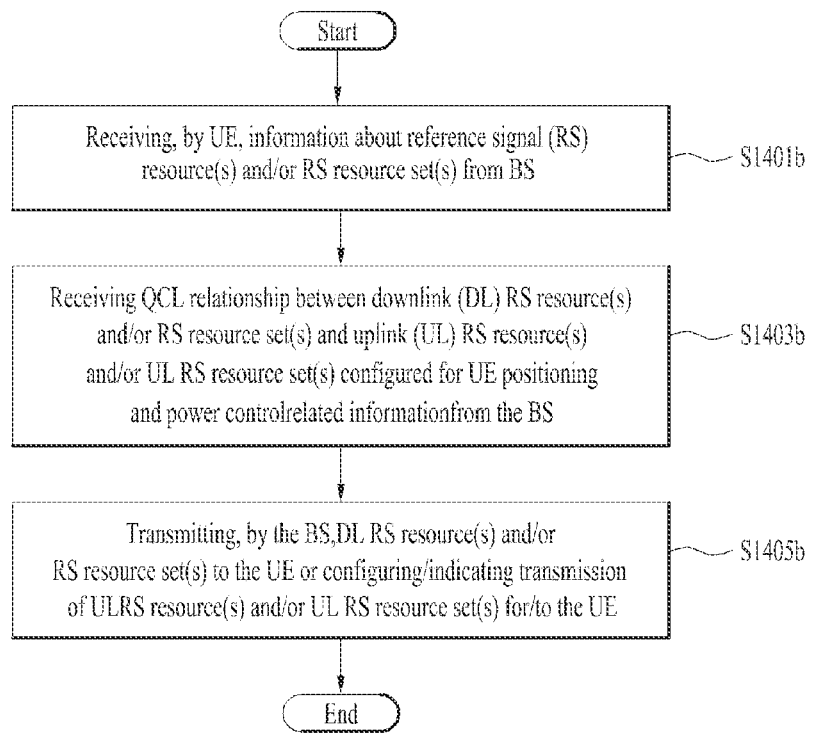

Referring to FIG. 24B, in S1401b, the UE may receive information about RS resource(s) and/or RS resource set(s) from the BS/location server. For example, the RS may be an SRS for positioning. In S1403b, the UE may receive a configuration/indication of QCL relationship between DL RS resource(s) and/or DL RS resource set(s) and UL RS resource(s) and/or UL RS resource set(s) configured for UE positioning and information about power control from the BS/location server. In S1305b, based on the configured/indicated information, the UE may receive DL RS resource(s) and/or DL RS resource set(s), may receive a configuration/indication of transmission of UI. RS resource(s) and/or UL RS resource set(s), or may transmit an SRS signal on the UL RS resource(s) and/or UL RS resource set(s).

3.3. DRX (Discontinuous Reception) Operation

Figure 25:
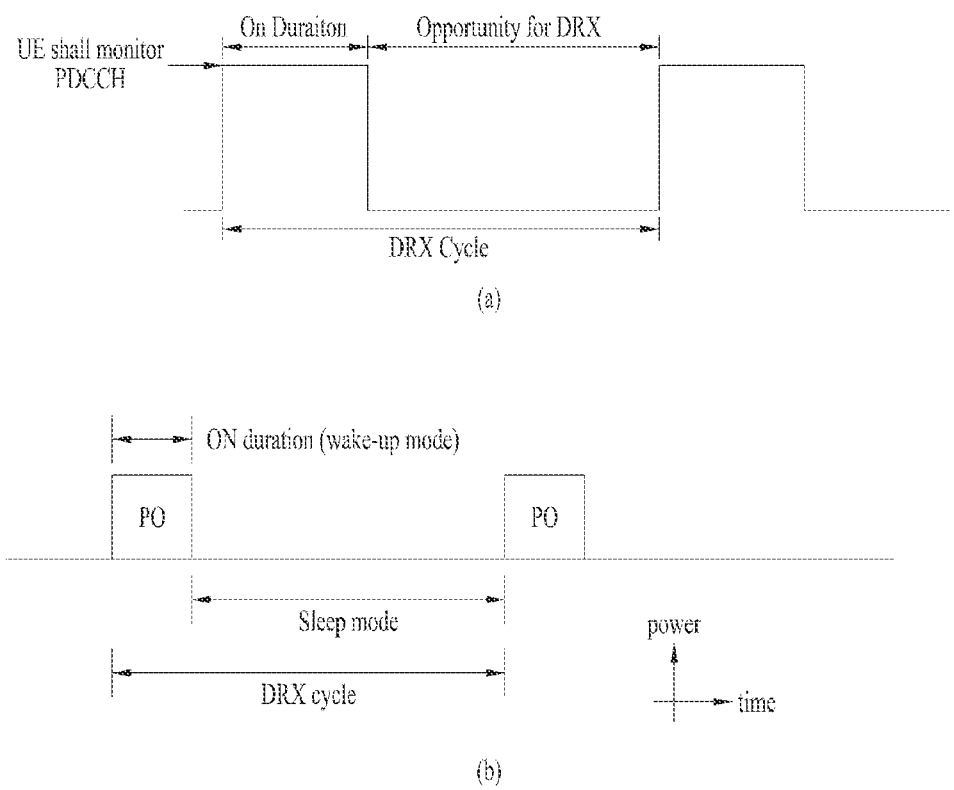
FIG. 25 is a diagram illustrating an exemplary discontinuous reception (DRX) operation according to various examples of the present disclosure.

FIG. 25 is an exemplary DRX operation according to various embodiments of the present disclosure.

According to various embodiments of the present disclosure, the UE may perform a DRX operation in the afore-described/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

3.3.1. RRC_CONNECTED DRX

In in the RRC_CONNECTED state, DRX is used to receive a PDCCH discontinuously. DRX in the RRC_CONNECTED state is referred to as RRC_CONNECTED DRX).

Referring to FIG. 25(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 16 describes a DRX operation of a UE (in the RRC_CONNECTED state). Referring to Table 16, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 16

| | Type of signals | LE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

3.3.2. RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 25(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

The above-described DRX operation may be combined with the contents of the above-described Sections 1 to 3 to configure various other examples of the present disclosure, which will be clearly understood by those of ordinary skill in the art.

Figure 26:
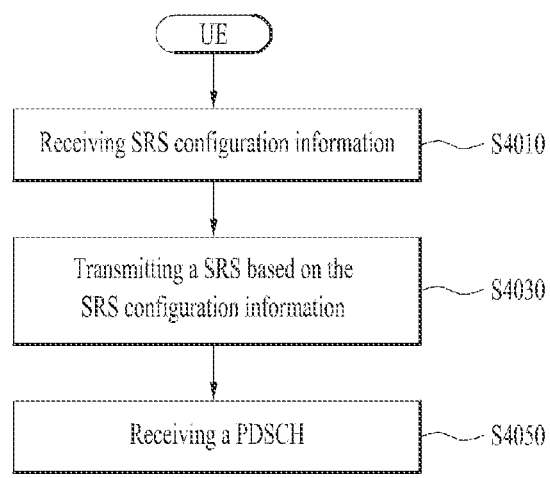
FIG. 26 is a flowchart illustrating a UL RS transmission method for a UE according to an example of the present disclosure.

FIG. 26 is a flowchart illustrating a UL RS transmission method for a UE according to an example of the present disclosure.

Referring to FIG. 26, in S4010, the UE may receive uplink reference signal (UL RS) configuration information.

In S4030, the UE may transmit a UL RS on a UL RS resource configured based on the UL RS configuration information, wherein the UL RS resource may include at least one resource element (RE). Here, the at least one RE may be configured as an N-comb in the frequency domain, and the starting position of each of the at least one RE in the frequency domain may be determined based on a comb offset included in the UL RS configuration information and a preset offset. The preset offset may be obtained based on the N-comb and at least one orthogonal frequency division multiplexing (OFDM) symbol for the at least one RE, wherein N may be a natural number.

In S4050, the UE may decode a physical downlink shared channel (PDSCH) in a predetermined PDSCH resource region. In this case, based on discontinuous reception (DRX) being configured, a physical downlink control channel (PDCCH) for the PDSCH may be monitored within an On duration related to the DRX.

For example, based on the UL RS being configured for positioning, the preset offset may differ among the at least one OFDM symbol.

For example, each of the at least one RE may be configured at intervals of N from the starting position in an ascending order in the frequency domain.

For example, the starting position of each of the at least one RE in the frequency domain may be determined based on a modulo N operation performed on a value obtained by adding the comb offset and the preset offset.

For example, the UL RS configuration information may be received through a higher layer.

For example, a transmit power for the UL RS may be determined based on a path-loss measured from an RS configured as quasi co-location (QCL) type-D.

For example, the UL RS may be a sounding reference signal (SRS).

Figure 27:
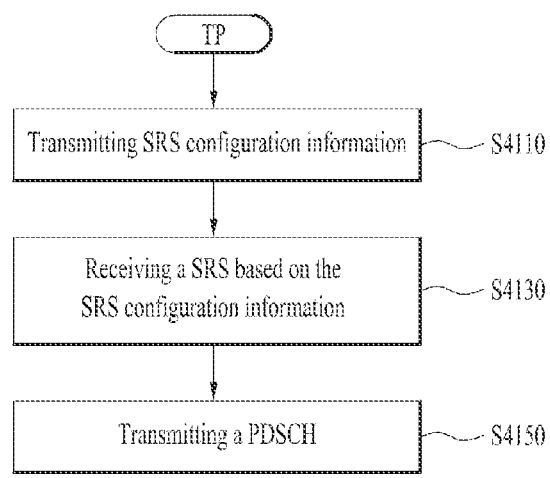
FIG. 27 is a flowchart illustrating a UL RS reception method of a TP according to an example of the present disclosure.

FIG. 27 is a flowchart illustrating a UL RS reception method for a TP according to an example of the present disclosure.

Referring to FIG. 27, in S4110, a TP may transmit uplink reference signal (UL RS) configuration information.

In S4130, the TP may transmit a UL RS on a UL RS resource configured based on the UL RS configuration information, wherein the UL RS resource may include at least one resource element (RE). Here, the at least one RE may be configured as an N-comb in the frequency domain, and the starting position of each of the at least one RE in the frequency domain may be determined based on a comb offset included in the UL RS configuration information and a preset offset. The preset offset may be obtained based on the N-comb and at least one orthogonal frequency division multiplexing (OFDM) symbol for the at least one RE, wherein N may be a natural number.

In S4150, the TP may transmit a physical downlink shared channel (PDSCH) in a predetermined PDSCH resource region. In this case, based on discontinuous reception (DRX) being configured, a physical downlink control channel (PDCCH) for the PDSCH may be transmitted within an On duration related to the DRX.

More specific operations of the UE and/or the TP and/or the location server according to the above-described various examples of the present disclosure may be described and performed based on the descriptions of Sections 1 to 3.

Examples of the above-described proposed methods may also be included as one of various examples of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Examples of the Present Disclosure 4.1. Exemplary Configurations of Devices to which Various Examples of the Present Disclosure are Applied FIG. 28 is a diagram illustrating devices that implement various examples of the present disclosure.

Figure 28:
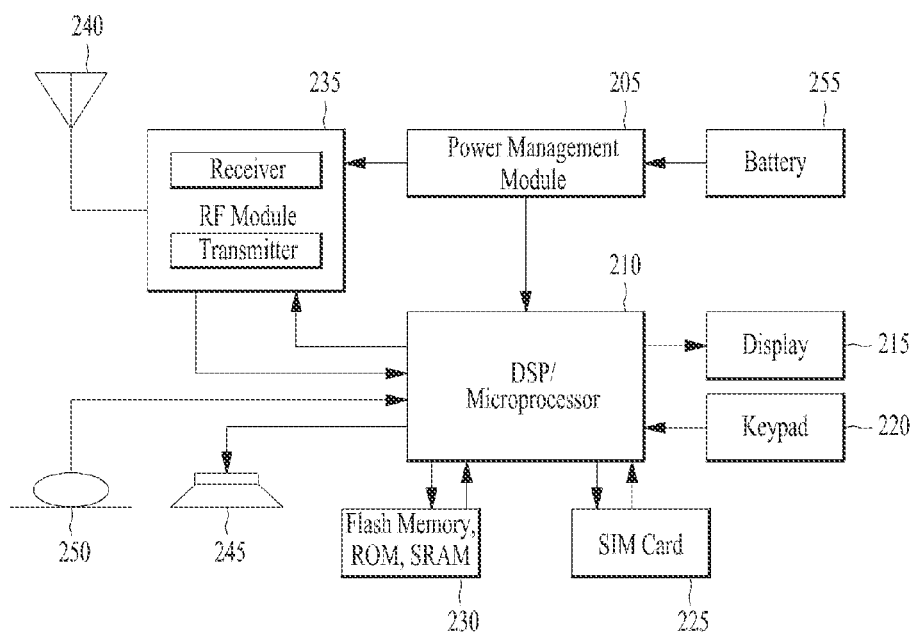
FIG. 28 is a diagram illustrating devices that may implement various embodiments of the present disclosure.

The devices illustrated in FIG. 28 may be a UE and/or a BS (e.g., eNB or gNB) adapted to perform the afore-described mechanisms, or any devices performing the same operation.

Referring to FIG. 28, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 28 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 28 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various examples of the present disclosure may operate as follows, while controlling a memory.

According to various examples of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various examples of the present disclosure, the at least one processor included in the UE (or the at least one processor of the communication device included in the UE) may receive uplink reference signal (UL RS) configuration information.

According to various examples of the present disclosure, the at least one processor included in the UE may transmit a UL RS on a UL RS resource configured based on the UL RS configuration information, wherein the UL RS resource may include at least one resource element (RE).

According to various examples of the present disclosure, the at least one processor included in the UE may decode a physical downlink shared channel (PDSCH) in a predetermined PDSCH resource region.

For example, based on discontinuous reception (DRX) being configured, a physical downlink control channel (PDCCH) for the PDSCH may be monitored within an On duration related to the DRX.

For example, the at least one RE may be configured as an N-comb in the frequency domain, and the starting position of each of the at least one RE in the frequency domain may be determined based on a comb offset included in the UL RS configuration information and a preset offset.

For example, the preset offset may be obtained based on the N-comb and at least one orthogonal frequency division multiplexing (OFDM) symbol for the at least one RE, wherein N may be a natural number.

For example, based on the UL RS being configured for positioning, the preset offset may differ among the at least one OFDM symbol.

For example, each of the at least one RE may be configured at intervals of N from the starting position in an ascending order in the frequency domain.

For example, the starting position of each of the at least one RE in the frequency domain may be determined based on a modulo N operation performed on a value obtained by adding the comb offset and the preset offset.

For example, the UL RS configuration information may be received through a higher layer.

For example, a transmit power for the UL RS may be determined based on a path-loss measured from an RS configured as quasi co-location (QCL) type-D.

For example, the UL RS may be a sounding reference signal (SRS).

According to various examples of the present disclosure, at least one processor included in a BS (or at least one processor of a communication device included in the BS) may transmit uplink reference signal (UL RS) configuration information.

According to various examples of the present disclosure, the at least one processor included in the BS may receive a UL RS on a UL RS resource configured based on the UL RS configuration information, wherein the UL RS resource may include at least one resource element (RE).

According to various examples of the present disclosure, the at least one processor included in the BS may transmit a physical downlink shared channel (PDSCH) in a predetermined PDSCH resource region.

For example, based on discontinuous reception (DRX) being configured, a physical downlink control channel (PDCCH) for the PDSCH may be transmitted within an On duration related to the DRX.

For example, the at least one RE may be configured as an N-comb in the frequency domain, and the starting position of each of the at least one RE in the frequency domain may be determined based on a comb offset included in the UL RS configuration information and a preset offset.

For example, the preset offset may be obtained based on the N-comb and at least one orthogonal frequency division multiplexing (OFDM) symbol for the at least one RE, wherein N may be a natural number.

More specific operations of the processor included in the UE and/or the BS and/or the location server according to the above-described various examples of the present disclosure may be described and performed based on the descriptions of Sections 1 to 3.

Unless contradicting each other, various examples of the present disclosure may be implemented in combination. For example, (a processor or the like included in) a UE and/or a BS and/or a location server according to various examples of the present disclosure may implement the embodiments described in Sections 1 to 3 in combination, unless contradicting each other.

4.2. Example of Communication System to which Various Examples of the Present Disclosure are Applied In the present specification, various examples of the present disclosure have been mainly described in relation to data transmission and reception between a BS and a UE in a wireless communication system. However, various examples of the present disclosure are not limited thereto. For example, various examples of the present disclosure may also relate to the following technical configurations.

The various descriptions, functions, procedures, proposals, methods, and/or operational flowcharts of the various examples of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 29:
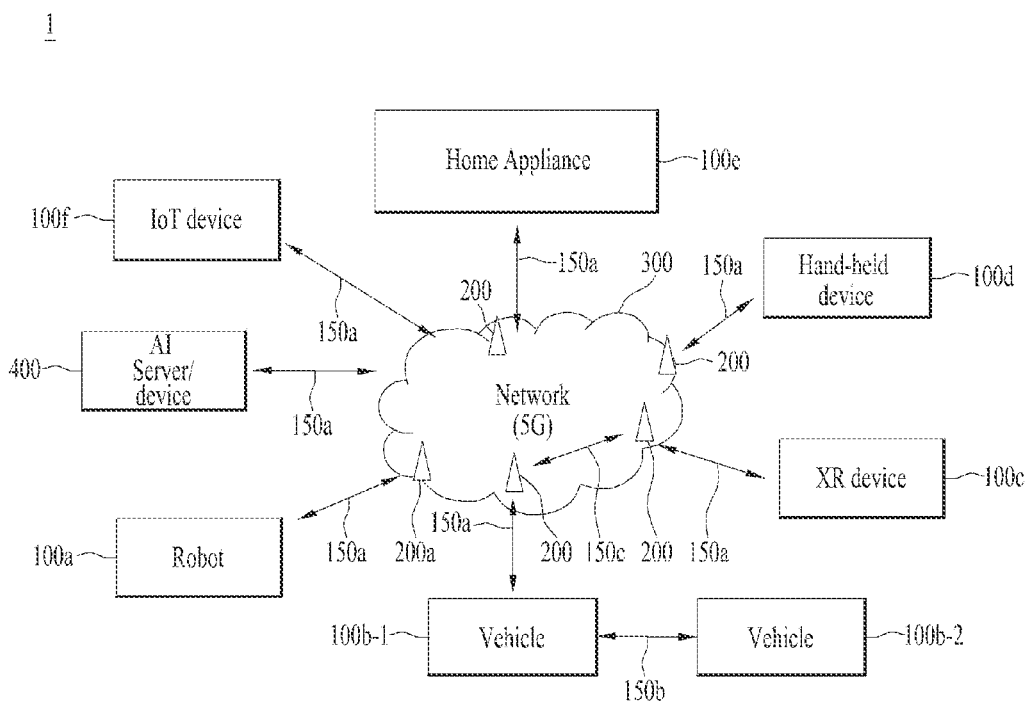
FIG. 29 illustrates an exemplary communication system to which various embodiments of the present disclosure are applied.

FIG. 29 illustrates an exemplary communication system to which various examples of the present disclosure are applied.

Referring to FIG. 29, a communication system 1 applied to the various examples of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various examples of the present disclosure.

Figure 30:
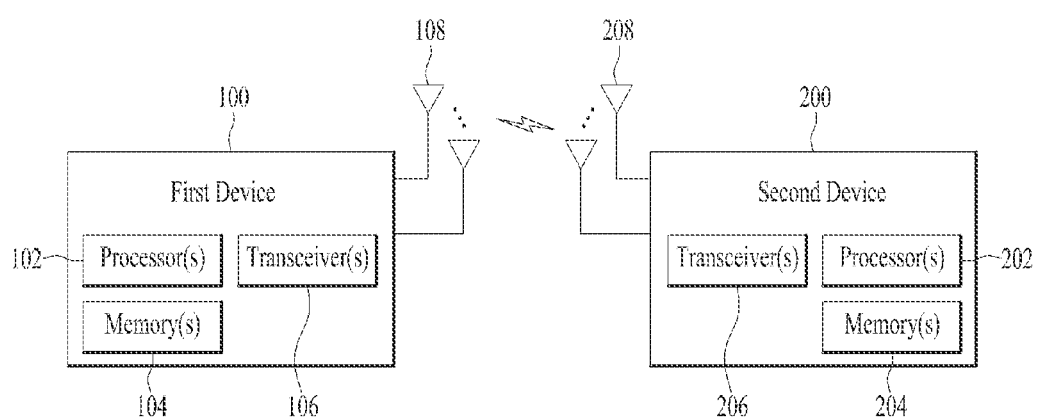
FIG. 30 illustrates exemplary wireless devices to which various examples of the present disclosure are applicable.

4.2.1 Example of Wireless Devices to which Various Examples of the Present Disclosure are Applied FIG. 30 illustrates exemplary wireless devices to which various examples of the present disclosure are applicable.

Referring to FIG. 30, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various examples of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various examples of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RIC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control such that the one or more transceivers 106 and 206 may transmit user data, control information, or radio signals to one or more other devices. The one or more processors 102 and 202 may perform control such that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various examples of the present disclosure, one or more memories (e.g., 104 or 204) may store instructions or programs which, when executed, cause one or more processors operably coupled to the one or more memories to perform operations according to various examples or implementations of the present disclosure.

According to various examples of the present disclosure, a computer-readable storage medium may store one or more instructions or computer programs which, when executed by one or more processors, cause the one or more processors to perform operations according to various examples or implementations of the present disclosure.

According to various examples of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various examples or implementations of the present disclosure.

4.2.2. Example of Using Wireless Devices to which Various Examples of the Present Disclosure are Applied FIG. 30 illustrates other exemplary wireless devices to which various examples of the present disclosure are applied. The wireless devices may be implemented in various forms according to a use case/service (see FIG. 28).

Figure 31:
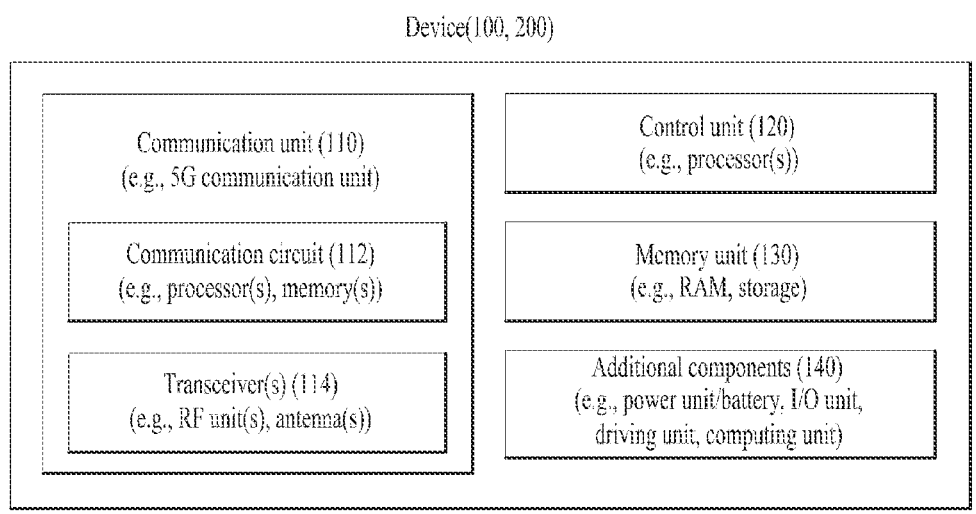
FIG. 31 illustrates other exemplary wireless devices to which various examples of the present disclosure are applied.

Referring to FIG. 31, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 31, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 31 will be described in detail with reference to the drawings.

Figure 32:
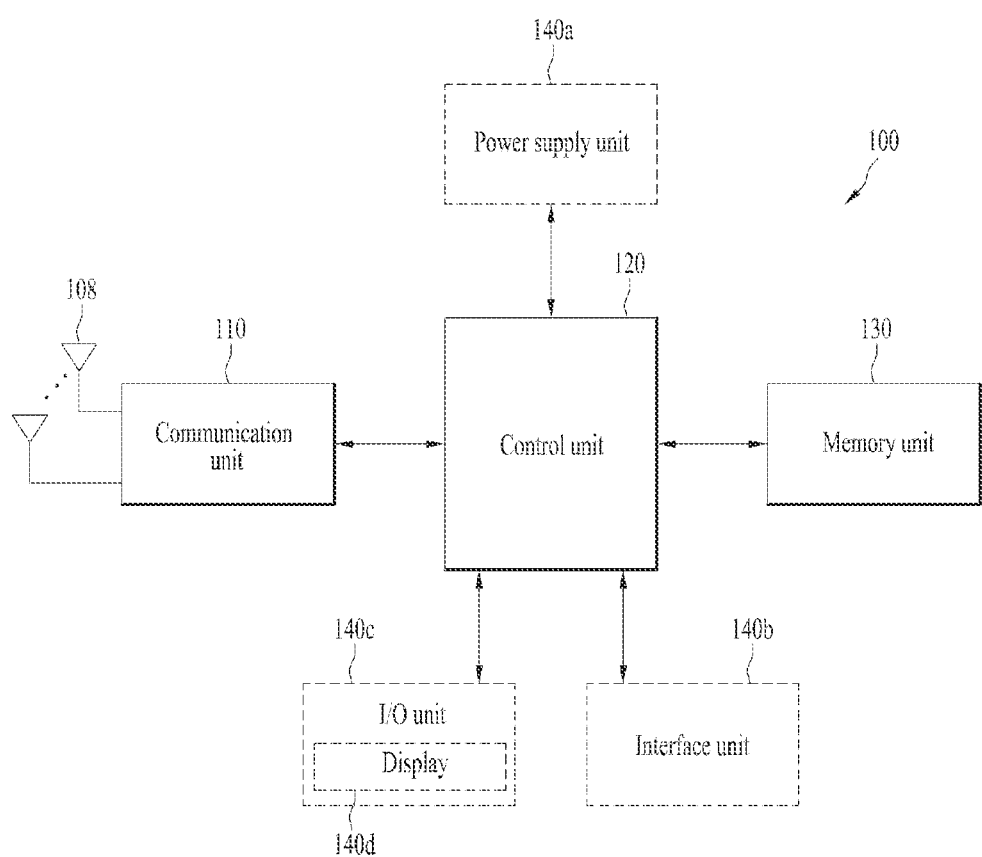
FIG. 32 illustrates an exemplary portable device to which various examples of the present disclosure are applied.

4.2.3. Example of Portable Device to which Various Examples of the Present disclosure are applied FIG. 32 illustrates an exemplary portable device to which various examples of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 32, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 33:
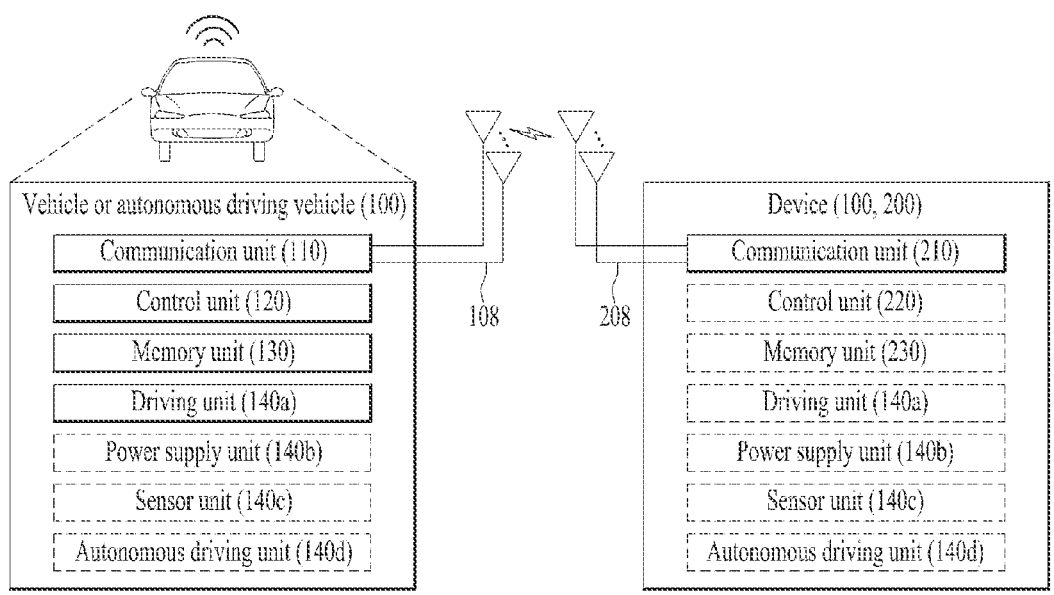
FIG. 33 illustrates an exemplary vehicle or autonomous driving vehicle to which various examples of the present disclosure.

4.2.4. Example of Vehicle or Autonomous Driving Vehicle to which Various Examples of the Present Disclosure FIG. 33 illustrates an exemplary vehicle or autonomous driving vehicle to which various examples of the present disclosure. The vehicle or autonomous driving vehicle may be implemented as a mobile robot, a car, a train, a manned/unmanned aerial vehicle (AV), a ship, or the like.

Referring to FIG. 33, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

4.2.5. Example of AR/VR and Vehicle to which Various Examples of the Present Disclosure FIG. 34 illustrates an exemplary vehicle to which various examples of the present disclosure are applied. The vehicle may be implemented as a transportation means, a train, an aircraft, a ship, or the like.

Referring to FIG. 34, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 31.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various examples of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented by various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems. Examples of the various wireless access systems include a 3GPP system or a 3GPP2 system. Besides these wireless access systems, the various embodiments of the present disclosure are applicable to all technical fields in which the wireless access systems find their applications. Moreover, the proposed methods are also applicable to an mmWave communication system using an ultra-high frequency band.

The invention claimed is:

1. A method performed by a user equipment (UE) in a wireless communication system, the method comprising:
    receiving uplink reference signal (UL RS) configuration information;
    transmitting a UL RS on a UL RS resource configured based on the UL RS configuration information, the UL RS resource including resource elements (REs); and
    decoding a physical downlink shared channel (PDSCH) in a certain resource region,
    wherein, based on discontinuous reception (DRX) being configured, a physical downlink control channel (PDCCH) for the PDSCH is monitored within an on duration related to the DRX,
    wherein the REs are configured as an N-comb in a frequency domain,
    wherein each starting position of each of the at least one RE in the frequency domain is determined based on a comb offset for the frequency domain and a preset offset for the frequency domain,
    wherein the comb offset is obtained based on information regarding the comb offset received from the UL RS configuration information,
    wherein the preset offset is obtained based on the N-comb and orthogonal frequency division multiplexing (OFDM) symbols for the REs,
    wherein N is a natural number.

2. The method of claim 1, wherein, based on the UL RS being configured for positioning, the preset offset differs among the OFDM symbols.

3. The method of claim 1, wherein each of the REs is configured at intervals of N from the starting position in ascending order in the frequency domain.

4. The method of claim 1, wherein each starting position of each of the REs in the frequency domain is determined based on a modulo N operation performed on a value obtained by adding the comb offset and the preset offset.

5. The method of claim 1, wherein the UL RS configuration information is received through a higher layer.

6. The method of claim 1, wherein a transmit power for the UL RS is determined based on a path-loss measured through a reference signal (RS) configured as quasi co-location (QCL) type-D.

7. The method of claim 1, wherein the UL RS is a sounding reference signal (SRS).

8. A user equipment (UE) in a wireless communication system, comprising:
at least one transceiver;
at least one processor; and
at least one memory operably coupled to the at least one processors to store one or more instructions configured to cause the at least one processor to perform operations, the operations comprising:
receiving uplink reference signal (UL RS) configuration information;
transmitting a UL RS on a UL RS resource configured based on the UL RS configuration information, the UL RS resource including resource elements (REs); and
decoding a physical downlink shared channel (PDSCH) in a certain resource region,
wherein, based on discontinuous reception (DRX) being configured, a physical downlink control channel (PDCCH) for the PDSCH is monitored within an on duration related to the DRX,
wherein the REs are configured as an N-comb in a frequency domain,
wherein each starting position of each of the at least one RE in the frequency domain is determined based on a comb offset for the frequency domain and a preset offset for the frequency domain,
wherein the comb offset is obtained based on information regarding the comb offset received from the UL RS configuration information,
wherein the preset offset is obtained based on the N-comb and orthogonal frequency division multiplexing (OFDM) symbols for the REs,
wherein N is a natural number.

9. A method for a base station in a wireless communication system, the method comprising:
transmitting uplink reference signal (UL RS) configuration information;
receiving a UL RS on a UL RS resource configured based on the UL RS configuration information, the UL RS resource including resource elements (REs); and
transmitting a physical downlink shared channel (PDSCH) in a certain resource region,
wherein, based on discontinuous reception (DRX) being configured, a physical downlink control channel (PDCCH) for the PDSCH is transmitted within an on duration related to the DRX,
wherein the REs are configured as an N-comb in a frequency domain,
wherein each starting position of each of the at least one RE in the frequency domain is determined based on a comb offset for the frequency domain and a preset offset for the frequency domain,
wherein information regarding the comb offset is transmitted by the base station through the UL RS configuration information,
wherein the preset offset is obtained based on the N-comb and orthogonal frequency division multiplexing (OFDM) symbols for the REs,
wherein N is a natural number.

10. A base station in a wireless communication system, comprising:
at least one processor; and
at least one memory operably coupled to the at least one processors to store one or more instructions configured to cause the at least one processor to perform operations, the operations comprising:
transmitting uplink reference signal (UL RS) configuration information;
receiving a UL RS on a UL RS resource configured based on the UL RS configuration information, the UL RS resource including resource elements (REs); and
transmitting a physical downlink shared channel (PDSCH) in a certain resource region,
wherein, based on discontinuous reception (DRX) being configured, a physical downlink control channel (PDCCH) for the PDSCH is transmitted within an on duration related to the DRX,
wherein the REs are configured as an N-comb in a frequency domain,
wherein each starting position of each of the at least one RE in the frequency domain is determined based on a comb offset for the frequency domain and a preset offset for the frequency domain,
wherein information regarding the comb offset is transmitted by the base station through the UL RS configuration information,
wherein the preset offset is obtained based on the N-comb and orthogonal frequency division multiplexing (OFDM) symbols for the REs,
wherein N is a natural number.

* * * * *